United States Patent
Nguyen et al.

(10) Patent No.: US 12,424,222 B2
(45) Date of Patent: *Sep. 23, 2025

(54) DYNAMIC ADAPTATION OF PARAMETER SET USED IN HOT WORD FREE ADAPTATION OF AUTOMATED ASSISTANT

(71) Applicant: GOOGLE LLC, Mountain View, CA (US)

(72) Inventors: Tuan Nguyen, San Jose, CA (US);
Gabriel Leblanc, Sunnyvale, CA (US);
Qiong Huang, San Jose, CA (US);
Alexey Galata, San Jose, CA (US);
Tzu-Chan Chuang, San Francisco, CA (US); William A Truong, San Jose, CA (US); Yixing Cai, San Jose, CA (US);
Yuan Yuan, Redwood City, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/751,972

(22) Filed: Jun. 24, 2024

(65) Prior Publication Data
US 2024/0347062 A1    Oct. 17, 2024

Related U.S. Application Data

(63) Continuation of application No. 17/579,110, filed on Jan. 19, 2022, now Pat. No. 12,020,704.

(51) Int. Cl.
*G10L 17/22*    (2013.01)
*G06V 40/10*    (2022.01)
(Continued)

(52) U.S. Cl.
CPC ............ *G10L 15/22* (2013.01); *G06V 40/103* (2022.01); *G10L 15/08* (2013.01); *G10L 15/24* (2013.01);
(Continued)

(58) Field of Classification Search
CPC ............ G06F 3/167; G06F 3/013; G10L 17/22
See application file for complete search history.

(56) References Cited

U.S. PATENT DOCUMENTS 8,885,882 B1   11/2014   Mn et al.
9,250,703 B2 *  2/2016   Hernandez-Abrego ..................
                                                    A63F 13/10
(Continued)

FOREIGN PATENT DOCUMENTS

EP    2891954    7/2015
EP    2966644    1/2016
(Continued)

OTHER PUBLICATIONS

European Patent Office; International Search Report and Written Opinion issued in Application No. PCT/US2022/048710; 19 pages; dated Mar. 3, 2023.
(Continued)

*Primary Examiner* — Feng-Tzer Tzeng
(74) *Attorney, Agent, or Firm* — Gray Ice Higdon

(57) ABSTRACT

Hot word free adaptation, of function(s) of an automated assistant, responsive to determining, based on gaze measure(s) and/or active speech measure(s), that a user is engaging with the automated assistant. Implementations relate to techniques for mitigating false positive occurrences of and/or false negative occurrences, of hot word free adaptation, through utilization of a permissive parameter set in some situation(s) and a restrictive parameter set in other situation(s). For example, utilizing the restrictive parameter set when it is determined that a user is engaged in conversation with additional user(s). The permissive parameter set includes permissive parameter(s) that are more permissive than counterpart(s) in the restrictive parameter set. A parameter set is utilized in determining whether condition(s) are satisfied, where those condition(s), if satisfied, indicate that
(Continued)

the user is engaging in hot word free interaction with the automated assistant and result in adaptation of function(s) of the automated assistant.

20 Claims, 7 Drawing Sheets

(51) Int. Cl.
| | | |
|---|---|---|
| *G10L 15/08* | (2006.01) | |
| *G10L 15/22* | (2006.01) | |
| *G10L 15/24* | (2013.01) | |
| *G10L 25/78* | (2013.01) | |
| *G06F 3/01* | (2006.01) | |
| *G06F 3/16* | (2006.01) | |

(52) U.S. Cl.
CPC .............. *G10L 25/78* (2013.01); *G06F 3/013* (2013.01); *G06F 3/167* (2013.01); *G10L 2015/088* (2013.01); *G10L 2015/227* (2013.01); *G10L 17/22* (2013.01)

(56) References Cited

U.S. PATENT DOCUMENTS

| | | | |
|---|---|---|---|
| 9,263,044 B1 | 2/2016 | Cassidy et al. | |
| 9,423,870 B2 | 8/2016 | Teller et al. | |
| 9,691,411 B2 | 6/2017 | Scherer et al. | |
| 9,832,452 B1 | 11/2017 | Fotland et al. | |
| 9,939,896 B2 | 4/2018 | Teller et al. | |
| 10,075,491 B2 | 9/2018 | Smus | |
| 10,156,900 B2 | 12/2018 | Publicover et al. | |
| 10,423,225 B2 * | 9/2019 | Suk | G06F 3/04845 |
| 10,540,015 B2 * | 1/2020 | Li | G06F 3/011 |
| 10,726,521 B2 | 7/2020 | Leong | |
| 10,768,693 B2 | 9/2020 | Powderly et al. | |
| 10,853,911 B2 | 12/2020 | Leong | |
| 10,890,969 B2 | 1/2021 | Yuan et al. | |
| 11,561,621 B2 * | 1/2023 | Tang | G06F 3/017 |
| 2002/0135618 A1 | 9/2002 | Maes et al. | |
| 2004/0193413 A1 | 9/2004 | Wilson et al. | |
| 2006/0192775 A1 | 8/2006 | Nicholson et al. | |
| 2012/0062729 A1 | 3/2012 | Hart et al. | |
| 2013/0144616 A1 | 6/2013 | Bangalore | |
| 2013/0144629 A1 | 6/2013 | Johnston et al. | |
| 2013/0304479 A1 | 11/2013 | Teller et al. | |
| 2014/0016837 A1 | 1/2014 | Nechyba et al. | |
| 2014/0062862 A1 | 3/2014 | Yamashita | |
| 2014/0247208 A1 | 9/2014 | Henderek et al. | |
| 2014/0306874 A1 | 10/2014 | Finocchio et al. | |
| 2014/0361973 A1 | 12/2014 | Raux et al. | |
| 2015/0033130 A1 | 1/2015 | Scheessele | |
| 2015/0193005 A1 | 7/2015 | Di Censo et al. | |
| 2016/0011853 A1 | 1/2016 | Rogers et al. | |
| 2016/0026253 A1 | 1/2016 | Bradski et al. | |
| 2016/0042648 A1 | 2/2016 | Kothuri | |
| 2016/0132290 A1 | 5/2016 | Raux | |
| 2016/0203454 A1 | 7/2016 | Kogoshi | |
| 2016/0284134 A1 | 9/2016 | Kamhi et al. | |
| 2016/0309081 A1 | 10/2016 | Frahm et al. | |
| 2016/0320838 A1* | 11/2016 | Teller | G06F 3/167 |
| 2016/0373269 A1 | 12/2016 | Okubo et al. | |
| 2017/0160813 A1 | 6/2017 | Divakaran et al. | |
| 2017/0289766 A1 | 10/2017 | Scott et al. | |
| 2017/0312614 A1 | 11/2017 | Tran et al. | |
| 2017/0315825 A1 | 11/2017 | Gordon et al. | |
| 2018/0061400 A1 | 3/2018 | Carbune et al. | |
| 2018/0185753 A1 | 7/2018 | Nakagawa et al. | |
| 2018/0246569 A1 | 8/2018 | Arakawa et al. | |
| 2018/0367669 A1 | 12/2018 | Nicholson | |
| 2019/0102706 A1 | 4/2019 | Frank et al. | |
| 2019/0138268 A1 | 5/2019 | Andersen et al. | |
| 2019/0187787 A1 | 6/2019 | White et al. | |
| 2019/0199759 A1 | 6/2019 | Anderson et al. | |
| 2019/0246036 A1 | 8/2019 | Wu et al. | |
| 2019/0294252 A1 | 9/2019 | Li | |
| 2019/0304157 A1 | 10/2019 | Amer et al. | |
| 2019/0324527 A1 | 10/2019 | Presant et al. | |
| 2019/0369748 A1 | 12/2019 | Hindi et al. | |
| 2020/0104653 A1 | 4/2020 | Solomon et al. | |
| 2020/0167597 A1 | 5/2020 | Nguyen et al. | |
| 2020/0333875 A1 | 10/2020 | Bansal | |
| 2020/0341546 A1 | 10/2020 | Yuan et al. | |
| 2020/0342223 A1 | 10/2020 | Mixter et al. | |
| 2020/0349966 A1 | 11/2020 | Konzelmann et al. | |
| 2020/0380977 A1 | 12/2020 | Unter Ecker | |
| 2021/0089125 A1 | 3/2021 | Yuan et al. | |
| 2023/0230587 A1 | 7/2023 | Nguyen et al. | |

FOREIGN PATENT DOCUMENTS

| | | | |
|---|---|---|---|
| EP | 3012833 | 4/2016 | |
| EP | 3413303 | 7/2020 | |
| JP | H1124694 | 1/1999 | |
| JP | 2010102235 | 5/2010 | |
| JP | 2012242609 | 12/2012 | |
| JP | 2014048936 | 3/2014 | |
| JP | 2015514254 | 5/2015 | |
| JP | 2016004270 | 1/2016 | |
| JP | 2016131288 | 7/2016 | |
| JP | 2017010176 | 1/2017 | |
| JP | 2017138476 | 8/2017 | |
| JP | 2017138536 | 8/2017 | |
| WO | 2013162603 | 10/2013 | |
| WO | 2014203495 | 2/2017 | |
| WO | 2017002473 | 4/2018 | |
| WO | 2018061173 | 4/2018 | |
| WO | 2019190646 | 10/2019 | |
| WO | 2021076164 | 4/2021 | |
| WO | WO-2021076164 A1 * | 4/2021 | G06F 3/167 |

OTHER PUBLICATIONS

European Patent Office; Communication Pursuant to Article 94(3) EPC issue in Application Ser. No. 18728773.5; 6 pages; dated Aug. 21, 2020.

European Patent Office; International Search Report and Written Opinion of Ser. No. PCT/US2018/031164; 13 pages; dated Oct. 11, 2018.

Siatras, S. et al., "Visual Lip Activity Detection and Speaker Detection Using Mouth Regions Intensities;" IEEE Transactions on Circuits and Systems for Video Technology; vol. 19, Issue 1; 5 pages; Dec. 9, 2008.

European Patent Office; International Search Report and Written Opinion of PCT Ser. No. PCT/US2019/030487; 20 pages; dated Jul. 16, 2020.

International Search Report and Written Opinion issued in Application No. PCT/US2018/031170 dated Dec. 14, 2018 (16 Pages).

European Patent Office; Invitation to Pay Additional Fees; PCT Ser. No. PCT/US2019/030487; 13 pages; May 25, 2020.

European Patent Office: Intention To Grant issued in Application No. 18727930.2 dated Oct. 2, 2020.

European Patent Office; Communication Under Rule 7193) EPC issued in Application No. 18728773.5; 57 pages; dated Feb. 18, 2021.

Intellectual Property India; Examination Report issued in Application No. 202027052360; 8 pages; dated Sep. 10, 2021.

Japanese Patent Office; Notice of Reasons for Rejection issued in Application No. 2021512357; 14 pages; dated Jan. 4, 2022.

Intellectual Property India; Examination Report issued in Application No. 202027052363; 7 pages; dated Dec. 30, 2021.

Japanese Patent Office; Notice of Reasons for Rejection issued in Application No. 20215dated Jan. 4, 2022.

* cited by examiner

DYNAMIC ADAPTATION OF PARAMETER SET USED IN HOT WORD FREE ADAPTATION OF AUTOMATED ASSISTANT

BACKGROUND

Humans can engage in human-to-computer dialogs with interactive software applications referred to herein as "automated assistants" (also referred to as "digital agents," "interactive personal assistants," "intelligent personal assistants," "assistant applications," "conversational agents," etc.). For example, humans (which when they interact with automated assistants may be referred to as "users") can provide commands and/or requests to an automated assistant using spoken natural language input (i.e., utterances), which may in some cases be converted into text and then processed. An automated assistant responds to a request by providing responsive user interface output, which can include audible and/or visual user interface output. An automated assistant can additionally and/or alternatively respond to a request by controlling other computing device(s) such as smart device(s) (e.g., smart light(s), smart television(s)).

As mentioned above, many automated assistants are configured to be interacted with via spoken utterances. To preserve user privacy and/or to conserve resources, a user must often explicitly invoke an automated assistant before the automated assistant will fully process a spoken utterance. The explicit invocation of an automated assistant typically occurs in response to certain user interface input being received at a client device. The client device includes an assistant interface that provides, to a user of the client device, an interface for interfacing with the automated assistant (e.g., receives input from the user, and provides audible and/or graphical responses), and that interfaces with one or more additional components that implement the automated assistant (e.g., on-device component(s) and/or remote server device(s) that process user inputs and generate appropriate responses).

Some user interface inputs that have been used to invoke an automated assistant via a client device include a hardware and/or virtual button at the client device for invoking the automated assistant (e.g., a tap of a hardware button, a selection of a graphical interface element displayed by the client device). Many automated assistants can additionally or alternatively be invoked in response to one or more particular spoken invocation phrases, which are also known as "hot words/phrases" or "trigger words/phrases". For example, a particular spoken invocation phrase such as "Hey Assistant," "OK Assistant", and/or "Assistant" can be spoken to invoke an automated assistant.

SUMMARY

Many client devices that facilitate interaction with an automated assistant—also referred to herein as "assistant devices" (i.e., a client device that implements (at least in part) the automated assistant)-enable users to engage in touch-free interaction with the automated assistant. For example, assistant devices often include microphones that allow users to provide vocal utterances to invoke and/or otherwise interact with an automated assistant. Assistant devices described herein can additionally or alternatively incorporate, and/or be in communication with, one or more vision components (e.g., camera(s)), Light Detection and Ranging (LIDAR) component(s), radar component(s), etc.) to facilitate touch-free interactions with an automated assistant.

Implementations disclosed herein relate to hot word free adaptation of one or more function(s) of an automated assistant. Those implementations adapt function(s) of an automated assistant independent of detection of a hot word. Instead, those implementation(s) adapt the function(s) responsive to determining, based at least on processing vision data capture by vision component(s) of the assistant device, that condition(s) are satisfied that indicate a user, captured in the vision data, is intending to engage with the automated assistant via the assistant device. The adaptation of the function(s) can, in various implementations, include initiating certain automated assistant processing that, prior to adaptation, was dormant. For example, the function(s) that are adapted can include the initiation of automatic speech recognition (ASR) (e.g., local ASR at the assistant device), natural language understanding (NLU) (e.g., NLU at the assistant device and/or at remote server(s) based on ASR results from local ASR), fulfillment based on the ASR and/or NLU results (e.g., at the assistant device and/or remote servers), and/or transmission of data to remote server(s) (e.g., transmission of ASR results, audio data, and/or vision data). In many implementations, determining whether the condition(s) are satisfied can be performed entirely locally at the assistant device.

In various implementations, the automated assistant function(s) can be adapted in response to determining, based on processing vision data (e.g., images) and audio data captured by the client device, that a user's gaze is directed at the client device and that the same user is actively speaking. Determining that the same user is actively speaking can be based on determining, using the vision data, that a mouth of the user (captured in the vision data) is moving in a manner indicative of speech. Determining that the same user is actively speaking can additionally or alternatively be based on processing vision data along with temporally aligned audio data to determine that movement of the mouth of the same user is temporally correlated with speech that is captured in the audio data. In some of those various implementations, the function(s) can be adapted further in response to determining that additional condition(s) are satisfied, such as the same user being within a threshold distance of the assistant device and/or the same user being a registered user of the assistant device (e.g., by performing face recognition on the image(s)).

Accordingly, implementations disclosed herein enable interaction of a user with an automated assistant to be initiated and/or guided without the user needing to preface such interaction with utterance of a hot word. This enables reduced user input to be provided by the user (at least due to omission of the hot word), which directly lessens the duration of the interaction and thereby conserves various network resources and/or remote and/or local processing resources that would otherwise be utilized in a prolonged interaction. Moreover, hot words are often unnatural prescribed phrases that are awkward to speak. This awkwardness can add friction to the user-assistant interaction and/or further prolong the interaction.

While hot word free adaptation of an automated assistant achieves various technical benefits, there are drawback(s) that can result from false positive occurrences where it is incorrectly determined to perform hot word free adaptation(s) and/or from false negative occurrences where it is incorrectly determined to not perform hot word free adaptation(s). A false positive occurrence can result from determining satisfaction of condition(s) that indicate a user, captured in vision data, is intending to engage with an automated assistant of an assistant device when, in fact, the user is not intending to engage with the automated assistant. With a false positive occurrence, the function(s) are needlessly adapted, resulting in wasteful utilization of assistant device resource(s), remote server resource(s), and/or network resource(s). A false negative occurrence can result from determining that such condition(s) are not satisfied when, in fact, the user is intending to engage with the automated assistant. With a false negative occurrence, user interaction with the automated assistant is prolonged and the user may need to provide additional user input (e.g., speak a hot word) to actually cause the adaptation of the assistant function(s). Moreover, false negative occurrences and false positive occurrences can erode user confidence in hot word free adaptation, resulting in users electing to disable hot word free capabilities and preventing technical benefits thereof from being achieved.

Implementations disclosed herein recognize that false positive occurrences and/or false negative occurrences can be exacerbated where the same static parameters are always utilized in determining whether a user is intending to engage with an automated assistant of an assistant device. For example, some implementations recognize that, in processing image(s) and/or audio data that capture a user engaging in conversation with additional user(s) (e.g., co-present additional user(s) or additional user(s) on a phone call or video call), it can erroneously be determined that the user is engaging in hot word free interaction with the automated assistant when, in fact, the user is only engaging in conversation with the additional user(s). While setting static parameters to be more restrictive can mitigate occurrences of such erroneous false positive determinations, it can also increase occurrences of false negative determinations in situations when the user is indeed engaging in hot word free interaction with the automated assistant. For example, setting the static parameters to be more restrictive can increase occurrences of false negative determinations in situations where the user is not engaged in conversation with additional user(s) and, instead, is intending to engage in hot word free interaction with the automated assistant.

As a working example of some of these implementations, assume that determining that a user is intending to engage with the automated assistant (and adaptation of function(s) in response) is contingent at least on determining that a user's gaze is directed at the client device and that the same user is actively speaking.

More particularly and continuing with the working example, in determining that the user's gaze is directed at the client device, image frames, that each capture at least the user's eyes, can be processed to determine, for each image frame, a gaze measure that indicates a direction of the gaze in that frame (e.g., an angle relative to a camera that captured the image). Further, the direction of the gaze and, optionally, a distance of the user from the camera, can be used to determine if the gaze in the image is directed within a gaze area defined by a gaze area parameter. The gaze area encompasses the camera and an area around the camera. Determining that the user's gaze is directed at the client device can be contingent on determining that the gaze is directed within the gaze area for one or more image frames. For example, it can be contingent on determining that the gaze is directed within the gaze area for at least a certain quantity of image frames and/or for a certain duration as defined by a gaze persistence parameter. For instance, the gaze persistence parameter can define that the gaze must be directed within the gaze area for at least 3 out of 5 consecutive image frames that are processed in determining gaze measures.

Further, and continuing with the working example, in determining that the same user is actively speaking, a sequence of images, that each capture at least the user's mouth, can be processed (e.g., using a trained machine learning model such as a transformer or recurrent neural network), along with a temporally aligned sequence of audio data frames, to generate an active speech measure. The active speech measure reflects whether the images and audio data frames indicate movement of the mouth of the user (whose mouth is captured in the images) is temporally correlated with any speech included in the audio data. For example, the active speech measure can be a value from 0 to 1, with larger values indicating a higher probability of mouth movement being temporally correlated with speech than are lower values. The active speech measure can be compared to an active speech threshold parameter in determining whether the user is actively speaking. Accordingly, in situations where the active speech threshold parameter is correctly selected, active speaking should be determined when the images and audio data capture the user actively speaking. However, active speaking should not be determined when the images capture the user moving their mouth but not speaking (e.g., there is no speech in the audio data or only speech from other user(s)) and/or when the images fail to capture the user moving their mouth.

Still continuing with the working example, when the same static gaze area parameter, gaze persistence parameter, and/or active speech threshold parameter are utilized for each of multiple disparate situations, false positive occurrences and/or false negative occurrences can be exacerbated. For example, assume a conversation situation and a non-conversation situation. In the conversation situation a first user and a second user are co-present with one another, are actively engaged in a conversation with one another, and are positioned in front of an assistant device. Further, in the conversation situation the first user, while speaking "what's the weather tomorrow" to the second user during the conversation, diverts their gaze, away from the second user, for 1.0 seconds and in a particular direction that is toward the shared assistant device. In the non-conversation situation, the first user and the second user are also co-present with one another and also positioned in front of the assistant device, but are not actively engaged in a conversation with one another. Further, in the non-conversation situation the first user, intending to engage in hot word free interaction with the assistant device, speaks "what's the weather tomorrow" while gazing for 1.0 seconds in the same particular direction that is toward the shared assistant device.

If the gaze area parameter, gaze persistence parameter, and active speech threshold parameter are each static and set permissively, it can result in a false positive occurrence in the conversation situation. In contrast, if those parameter(s) are each static and instead set restrictively, it can result in a false negative occurrence in the non-conversation situation.

In view of these and other considerations, implementations disclosed herein further relate to various techniques for mitigating false positive occurrences and/or false negative occurrences through dynamically adapting parameter(s) in response to detecting occurrence and/or cessation of certain environmental situation(s). In those implementations, the parameter(s) that are dynamically adapted are utilized in determining whether any of one or more user(s), captured in vision data and/or audio data captured by an assistant device, is engaging in hot word free interaction with an automated assistant of the assistant device. Put another way, the parameter(s) that are dynamically adapted are utilized in determining whether condition(s) are satisfied, where those condition(s), if satisfied, indicate that the user is engaging in hot word free interaction with the automated assistant and result in adaptation of function(s) of the automated assistant. In some versions of those implementations, the parameter(s) are adapted to make them more restrictive in response to determining that conversation among two or more users is occurring and/or the parameter(s) are adapted to make them more permissive in response to determining that conversation among two or more users has ceased.

As one example, and continuing with the working example above, for the conversation situation a restrictive gaze area parameter can be used that is more restrictive (e.g., defines a smaller area) than a permissive gaze area parameter used for the non-conversation situation. For instance, the restrictive gaze area parameter can define an area that encompasses only the front facing surface of the assistant device, whereas the permissive gaze area parameter can define a larger area that encompasses the front facing surface as well as six inches beyond the periphery of the front facing surface.

As another example, and continuing with the working example, for the conversation situation a restrictive gaze persistence parameter can additionally or alternatively be used that is more restrictive (e.g., defines greater persistence) than a permissive gaze persistence parameter(s) used for the non-conversation situation. For instance, the restrictive gaze persistence parameter can define that the gaze must be directed within the gaze area for at least 80% of consecutive image frames processed in determining gaze measures, whereas the permissive gaze area parameter can define that the gaze must be directed within the gaze area for at least 60% of consecutive image frames processed in determining gaze measures.

As yet another example, and continuing with the working example, for the conversation situation a restrictive active speech threshold parameter can additionally or alternatively be used that is more restrictive (e.g., defines a mores strict threshold) that a permissive active speech threshold parameter used for the non-conversation situation. For instance, where higher active speech measures indicate greater confidence in active speech, the restrictive active speech threshold parameter can be 0.90, whereas the permissive active speech threshold parameter can be 0.75.

In these and other manners, one or more parameters can be dynamically adapted, in dependence on a detected situation, to mitigate the occurrence of false positives and/or false negatives. For example, a permissive parameter set can be used in some situation(s) and a restrictive parameter set can be used in other situation(s). The restrictive parameter set includes at least one restrictive parameter that is more restrictive than a corresponding permissive parameter of the permissive parameter set, and lacks the permissive parameter. Any remaining parameter(s) of the restrictive parameter set can be at least as restrictive as a corresponding permissive parameter of the permissive parameter set. In some implementations, the restrictive parameter set replaces all permissive parameters, of the permissive parameter set, with a more restrictive parameter counterpart.

As referenced above, in various implementations, parameter(s) are adapted to be more restrictive in response to detecting a conversation situation. Detecting a conversation situation can include determining that a user, captured in processed vision data and/or in processed audio data (e.g., speech of the user), is engaged in conversation with at least one additional user. One or more techniques can be utilized, optionally in parallel with one another, in determining that a user is engaged in conversation.

In some implementations, determining that at least one user is engaged in conversation can be a function of determining that two or more users are co-present in an environment with the assistant device. For example, the assistant device can detect whether multiple users are present based on processing vision data (e.g., to detect multiple faces) and/or audio data (e.g., to detect multiple voices). For instance, determining that at least one user is engaged in conversation can be contingent on determining that at least two users are co-present in an environment with the assistant device.

In some versions of those implementations, determining that the at least one user is engaged in conversation can additionally or alternatively be based on one or more other factors. In some of those versions, the other factor(s) can include: detecting occurrence(s) of voice activity; properties of measure(s), that are used in determining whether there is engagement with an automated assistant; and/or a current duration or current quantity of iterations of determining whether a user is engaging in hot word free interaction with an automated assistant.

For example, determining engagement in conversation can be based on detecting at least a threshold quantity and/or duration of occurrences of voice activity and/or detecting occurrences of voice activity from multiple disparate users. For instance, determining engagement in conversation can be contingent on detecting at least X seconds of collective voice activity over the last Y seconds (where Y is greater than X) and, optionally, detecting voice activity from multiple disparate users. As a particular example, determining engagement in conversation can be based on detecting voice activity from multiple disparate users by processing, locally at an assistant device, audio data that is detected via microphone(s) of the assistant device and determining that the audio data captures multiple different users speaking. For example, the audio data can be processed, using a text-independent speaker identification (TISID) model, to generate TISID embeddings, and multiple different users can be determined to be speaking in the audio data based on distance(s), between two or more of the TISID embeddings, being greater than a threshold. For instance, a first TISID embedding can be generated based on processing a first instance of voice activity, in part of the audio data, that correspond to a first user speaking, and a second TISID embedding can be generated based on processing a second instance of voice activity, in another part of the audio data, that corresponds to a second user speaking. The first TSID embedding will be far away, in embedding space, from the second TISID embedding since the first TISID embedding was generated based on audio data that captures the first user's speech the second TSID embedding was generated based on audio data that captures the second user's speech. The first and second TISID embeddings can be determined to be greater than a threshold and, as a result, engagement in conversation can be determined.

As another example, determining engagement in conversation can additionally or alternatively be based on measure(s) (e.g., gaze measure(s) and/or active speech measure(s)), that are used in monitoring for engagement with the automated assistant, having properties that satisfy certain condition(s). For instance, determining engagement in conversation can be based on the measure(s), while failing to collectively satisfy threshold(s) of permissive parameter(s), having one or more properties that indicate engagement in conversation. As a particular instance, if gaze measure(s) fail to satisfy respective permissive threshold(s), while active speech measure(s) satisfy permissive threshold(s) or at least satisfy lower bound threshold(s), this can indicate engagement in conversation as opposed to intent to engage the automated assistant. For example, if a first user is talking to a second user, while looking at the second user (as opposed to toward the assistant device), this can result in active speech measure(s) that are highly indicative of active speech and gaze measure(s) that are not highly indicative of gaze directed to the assistant device. In such a situation, engagement in conversation can be determined based on there being such indicative active speech measure(s) paired with non-indicative gaze measure(s). Optionally, determining engagement in conversation can be contingent on there being a persistent pairing of such indicative active speech measure(s) and non-indicative gaze measures (e.g., at least 5 of last 8 iterations resulted in such pairing). Also, for instance, determining engagement in conversation can be based on one or more of the measure(s) failing to satisfy threshold(s) of permissive parameter(s), but satisfying lower bound threshold(s). As a particular instance, if gaze measure(s) fail to satisfy respective permissive threshold(s) (e.g., 0.8 or 75% persistence), while satisfying lower bound threshold(s) (e.g., 0.5 or 50% persistence), this can indicate engagement in conversation as opposed to intent to engage the automated assistant.

As another example, determining engagement in conversation can additionally or alternatively be based on a current duration or a current quantity of iterations of determining whether a user is engaging in hot word free interaction with an automated assistant. For example, determining engagement in conversation can be based on the current instance of determining whether a user is engaging in hot word free interaction having been ongoing for a threshold duration of time without having determined the user is engaging in hot word free interaction. For example, the threshold can be 5 seconds, 10 seconds, or other threshold duration. In some implementations, determining engagement in conversation can be based on the current instance having been ongoing for the threshold duration and based on measure(s), during the current instance, having properties that satisfy certain condition(s). In some implementations, the current iterations of determining whether a user is engaging in hot word free interaction with an automated assistant of a client device can be initiated, by the client device, in response to detecting presence of one or more users. The client device can detect presence of one or more users using a dedicated presence sensor (e.g., a passive infrared sensor (PIR)), using vision data and a separate machine learning model (e.g., a separate machine learning model trained solely for human presence detection), and/or using audio data and a separate machine learning model (e.g., VAD using a VAD machine learning model).

In some implementations, determining that at least one user is engaged in conversation can be a function of determining that a user, in an environment with the assistant device, is participating in communication with user(s) that are not co-present in the environment. For example, determining that the user is engaged in a phone call, a video call, or other communication session via an additional device that is in addition to the assistant device. In some of those implementations, the assistant device determines that the user is participating in communication with user(s) that are not co-present responsive to receiving a transmission that indicates that a phone call is occurring via an additional client device that is linked with the assistant device. For example, the additional client device and the assistant device can be linked by virtue of both being registered with the same user account and/or both being assigned to the same structure in a smart home device topology. The transmission can be sent to the assistant device responsive to the additional client device sending an indication (e.g., directly to the assistant device or to a server in communication with the assistant device and the additional client device) that it is in a call. In some of those implementations, the assistant device additionally or alternatively determines the user is participating in communication with user(s) that are not co-present responsive to detecting, based on processing audio data frames detected via microphone(s) of the assistant device, an occurrence of a phone ringing or vibrating.

Although particular examples are provided above with respect to measures that can be generated and utilized in determining whether the user is engaging in hot word free interaction with the automated assistant, additional and/or alternative measures can be utilized in determining whether the user is engaging in hot word free interaction with the automated assistant. Moreover, in some implementations parameter(s) that are dynamically adapted according to technique disclosed herein can optionally additionally or alternatively include parameter(s) for use with those additional or alternative measure(s).

As one non-limiting example, a distance measure can be generated that predicts a distance of the user relative to the assistant device. For example, the distance measure can be generated based on processing image frame(s) (e.g., inferred from a size of the user's head in the image frame(s)). Determining that the user is engaging in hot word free interaction with the automated assistant can further be contingent on the distance measure satisfying a distance threshold parameter. Optionally, a restrictive distance threshold parameter can be utilized in certain situations and a permissive distance threshold parameter can be utilized in other situations. As an additional non-limiting example, a pose measure can be generated that predicts a pose of the head and/or body of a user relative to the assistant device. For example, the pose measure can be generated based on processing image frame(s) that capture the user's head and/or body. Determining that the user is engaging in hot word free interaction with the automated assistant can further be contingent on the pose measure satisfying pose threshold parameter(s). Optionally, permissive pose threshold parameter(s) can be utilized in some situations and restrictive pose threshold parameter(s) can be utilized in other situations.

As mentioned above, in some implementations the adaptation(s) that occur based on determining that the user is engaging in hot word free interaction with the automated assistant can include the initiation of certain processing of certain sensor data (e.g., audio data, video, image(s), etc.), whereas the certain processing was not being performed prior (i.e., it was dormant prior). For example, prior to an adaptation, the automated assistant can optionally locally minimally process audio data (e.g., in monitoring for occurrence of voice activity, occurrence of an explicit invocation phrase, and/or in generating active speech measure(s)) and/or can temporarily locally buffer audio data. Prior to the adaptation, the automated assistant will "discard" the audio data after the local processing and/or temporary buffering, and without causing the audio data to be processed by one or more additional components of the automated assistant. Such additional components can include, for example, local and/or remote ASR processors, local and/or remote NLU component(s), local and/or remote component(s) that verify a spoken utterance included in the audio data is intended for the automated assistant (also referred to herein as "semantic filtering") and/or is from a certain speaker, such as one that matches a speaker visually identified based on facial recognition (also referred to herein as "text-independent speaker identification/recognition"). However, in response to determining that the user is engaging in hot word free interaction with the automated assistant, the adaptation can include causing audio data to be processed by one or more of the additional component(s). In these and other manners, processing and/or network resources can be reduced by only transmitting and/or performing certain processing of audio data in response to determining occurrence of certain conditions.

Also, for instance, prior to an adaptation, the automated assistant can optionally locally process vision data for only certain purposes such as generating measures, described herein, used in determining whether the user is engaging in hot word free interaction with the automated assistant. Prior to such adaptation, the automated assistant can refrain from certain processing of the vision data such as refraining from transmitting of any vision data to remote automated assistant component(s) and/or refraining from generating response(s) to any gesture(s) of the user captured in such vision data. However, in response to determining that the user is engaging in hot word free interaction with the automated assistant, such further processing of the vision data can occur. In these and other manners, processing and/or network resources can be reduced by only transmitting and/or performing certain processing of vision data in response to occurrence of certain conditions.

As mentioned above, in many implementations determining whether the user is engaging in hot word free interaction with the automated assistant is performed entirely locally at the assistant device based on sensor data from vision component(s) of the assistant device (e.g., camera(s)), microphone(s) of the assistant device, and/or other sensor component(s) of the assistant device. Thus, in those implementations, determining whether to adapt automated assistant functions can occur locally at the assistant device and without any sensor data from the assistant device and/or other data from the assistant device being transmitted over network(s) to one or more remote automated assistant component(s). Rather, such transmission(s) can optionally be one of the automated assistant function(s) that are adapted, and can occur only responsive to the local determination to adapt such function(s). In addition to maintaining security of sensor data and/or other local assistant device data by preventing its transmission unless certain conditions are met, such implementations further conserve network resources, and resources of remote devices, through such local determinations. Further, such implementations enable determinations to be made quickly and without the added latency that would otherwise be present due to client-server transmissions. Such reduced latency can likewise reduce the overall duration of the user-assistant interaction.

More generally, various implementations described herein can provide efficiencies in computing resources and communication networks used to implement automated assistants. For example, as will be evident from description herein, aspects of the implementations can produce more selective and/or per-situation adaptation of initiation of communication over a data network and corresponding reductions in data traffic over the network. The more selective initiation of network communication, e.g., from an assistant device, can further lead to more efficient usage of computing resources at a remote system with which the communication is initiated, since various potential communications from the assistant device are filtered out before any contact with the remote system is initiated. The efficiency improvements in usage of data networks and computing resources on remote systems can lead to significant savings in terms of power usage by transmitters and receivers in the network, as well as in terms of memory operations and processing usage at the remote system. Corresponding effects can also be experienced at the assistant device. These effects, particularly over time and with the ongoing operation of the automated assistant, allow significant additional capacity to be experienced in the network and in the computing apparatus as a whole, including the devices and systems which run the assistant. This additional capacity can be used for further communication in the data network, whether assistant-related or not, without the need to expand network capability e.g. through additional or updated infrastructure, and additional computing operations in the computing apparatus. Other technical improvements will be evident from the description herein.

In some implementations, in generating one or more measures described herein, trained machine learning model(s) (e.g., neural network model(s)) that are stored locally on the assistant device are utilized by the assistant device to at least selectively process at least portions of sensor data from sensor component(s) of the client device (e.g., image frames from camera(s) of the client device, audio data from microphone(s) of the device). For example, in response to detecting presence of one or more users (e.g., via a presence sensor), the assistant device can process, for at least a duration (e.g., for at least a threshold duration and/or until presence is no longer detected) at least portion(s) of vision data and/or audio data utilizing locally stored machine learning model(s) in generating measure(s) described herein. The client device can detect presence of one or more users using a dedicated presence sensor (e.g., a passive infrared sensor (PIR)), using vision data and a separate machine learning model (e.g., a separate machine learning model trained solely for human presence detection), and/or using audio data and a separate machine learning model (e.g., VAD using a VAD machine learning model).

In some implementations where local machine learning model(s) are utilized in generating measure(s), different model(s) can be utilized, with each being utilized in generating a different subset of the measure(s). In some versions of those implementations, one or more "upstream" models (e.g., object detection and classification model(s)) can be utilized to detect portions of vision data (e.g., image(s)) that are likely a face, likely eye(s), likely a mouth, etc.—and those portion(s) processed using a respective "downstream" machine learning model. For example, face and/or eye portion(s) of an image can be detected using the upstream model, and processed using a gaze machine learning model in determining gaze measure(s). Also, for example, face and/or mouth portion(s) of an image can be detected using the upstream model, and processed by an active speech machine learning model in determining active speech measure(s).

Some implementations disclosed herein include one or more computing devices that include one or more processors such as central processing unit(s) (CPU(s)), graphics processing unit(s) (GPU(s)), and/or tensor processing unit(s) (TPU(s)). One or more of the processors are operable to execute instructions stored in associated memory, and the instructions are configured to cause performance of any of the methods described herein. The computing devices can include, for example, assistant devices with microphone(s), at least one display, vision component(s), and/or other sensor component(s). Some implementations also include one or more non-transitory computer readable storage media storing computer instructions executable by one or more processors to perform any of the methods described herein.

DETAILED DESCRIPTION

Figure 1:
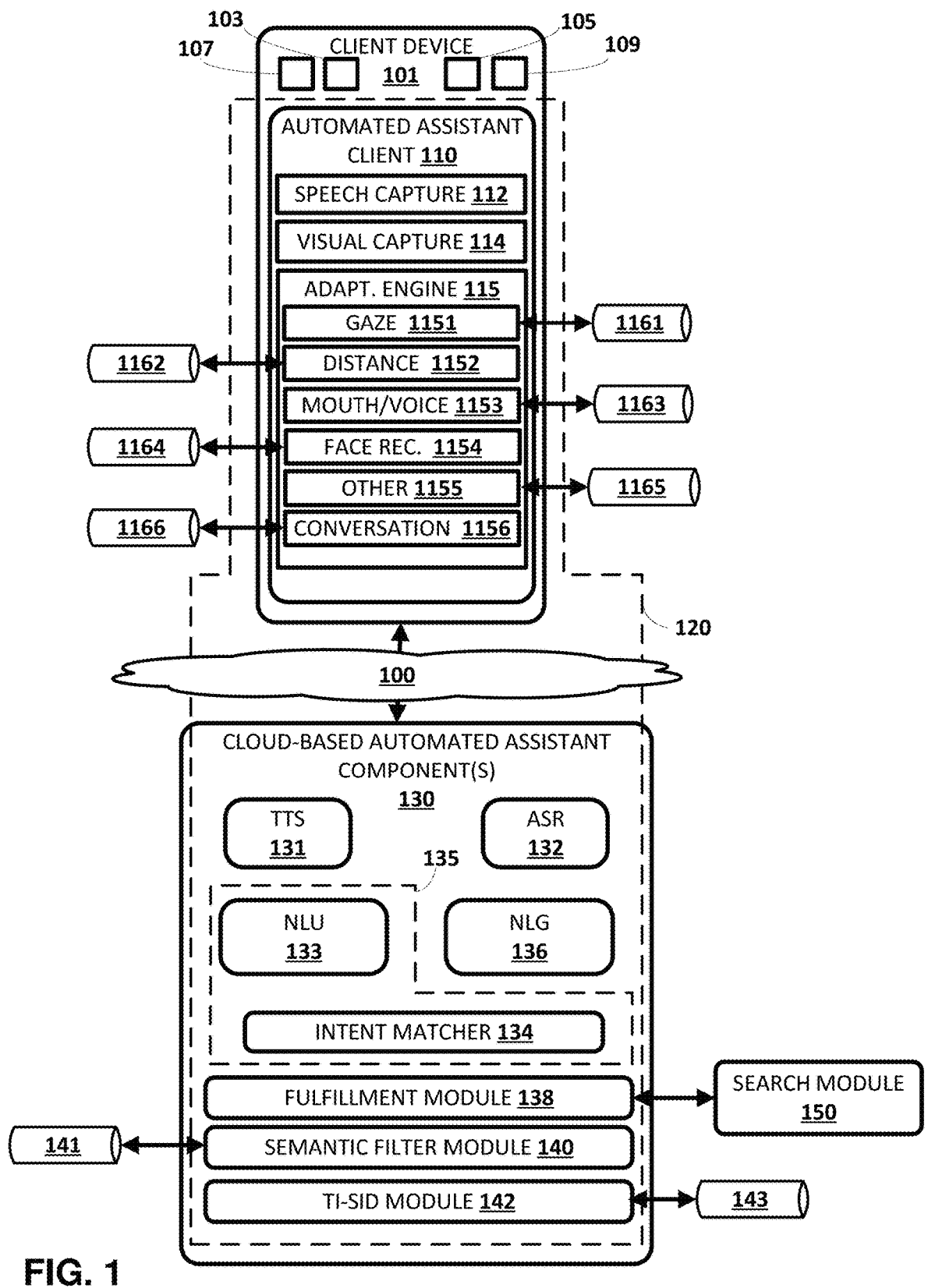
FIG. 1 is a block diagram of an example environment in which implementations disclosed herein may be implemented.

FIG. 1 illustrates an example environment in which techniques disclosed herein can be implemented. The example environment includes a client device 101 that at least selectively executes an automated assistant client 110. The term "assistant device" is also used herein to reference a client device 101 that at least selectively executes an automated assistant client 110. One or more cloud-based automated assistant components 130 can be implemented on one or more computing systems (collectively referred to as a "cloud" computing system) that are communicatively coupled to client device 101 via one or more local and/or wide area networks (e.g., the Internet) indicated generally at 100. The cloud-based automated assistant components 130 can be implemented, for example, via a cluster of high-performance servers.

In various implementations, an instance of an automated assistant client 110, by way of its interactions with one or more cloud-based automated assistant components 130, may form what appears to be, from a user's perspective, a logical instance of an automated assistant 120 with which the user may engage in a human-to-computer interactions (e.g., spoken interactions, gesture-based interactions, and/or touch-based interactions). One instance of such an automated assistant 120 is depicted in FIG. 1 in a dashed line. It thus should be understood that each user that engages with an automated assistant client 110 executing on a client device 101 may, in effect, engage with his or her own logical instance of an automated assistant 120. For the sake of brevity and simplicity, the term "automated assistant" as used herein as "serving" a particular user will refer to the combination of an automated assistant client 110 executing on a client device 101 operated by the user and optionally one or more cloud-based automated assistant components 130 (which may be shared amongst multiple automated assistant clients 110). It should also be understood that in some implementations, automated assistant 120 may respond to certain requests from any user regardless of whether the user is actually "served" by that particular instance of automated assistant 120.

The client device 101 can be, for example: a desktop computing device, a laptop computing device, a tablet computing device, a mobile phone computing device, a computing device of a vehicle of the user (e.g., an in-vehicle communications system, an in-vehicle entertainment system, an in-vehicle navigation system), a standalone interactive speaker (which in some cases may include a vision sensor), a smart appliance such as a smart television (or a standard television equipped with a networked dongle with automated assistant capabilities), and/or a wearable apparatus of the user that includes a computing device (e.g., a watch of the user having a computing device, glasses of the user having a computing device, a virtual or augmented reality computing device). Additional and/or alternative client computing devices may be provided. As noted previously, client device 101 can optionally take the form of an assistant device primarily designed to facilitate interactions between users and automated assistant 120 (e.g., a stand-alone interactive device with speaker(s), microphone(s), camera (and/or other vision component(s)), and a display).

Client device 101 can be equipped with one or more vision components 107 having one or more fields of view. Vision component(s) 107 can take various forms, such as monographic cameras, stereographic cameras, a LIDAR component, a radar component, etc. The one or more vision components 107 may be used, e.g., by a visual capture module 114, to capture vision frames (e.g., image frames (still images or video)) of an environment in which client device 101 is deployed. Client device 101 can also be equipped with one or more microphones 109. Speech capture module 112 can be configured to capture user speech and/or other audio data captured via microphone(s) 109.

Adaptation engine 115 processes vision data captured by visual capture module 114 and/or audio data captured by speech capture module 112 in generating one or more measures described herein. Moreover, adaptation engine 115 determines, based on generated measure(s), whether the user is engaging in hot word free interaction with the automated assistant 120 and, if so, causes adaptation of processing performed by the automated assistant 120, such as processing performed by the automated assistant client 110 and/or by the cloud-based automated assistant component(s) 130. Such adaptation can include, for example, adapting of sensor data processing by the client device 101 (e.g., by one or more components of the automated assistant client 110) and/or by one or more cloud-based automated assistant component(s) 130. For example, the adapting can include initiating certain sensor data processing that was dormant prior to the adapting. Adaptation engine 115, in determining, based on generated measure(s), whether the user is engaging in hot word free interaction with the automated assistant, also selectively utilizes different parameter(s) in that determining, optionally dependent on determination(s) by the conversation engine 1156 (described in more detail herein). For example, the adaptation engine 115 can utilize a permissive parameter set in some iterations of determining whether the user is engaging in hot word free interaction, and can instead utilize a restrictive parameter set in some other iterations of determining whether the user is engaging in hot word free interaction.

Client device 101 can also include one or more presence sensors 105 and/or one or more displays 103 (e.g., a touch-sensitive display). Display(s) 103 can be one of the user interface output component(s) through which user interface output is rendered in various implementations, such as visual cue(s) that indicate (directly or indirectly) whether a restrictive parameter set is being utilized. Display(s) 103 can further be one of the user interface output component(s) through which visual portion(s) of a response, from automated assistant client 110, is rendered. Presence sensor(s) 105 can include, for example, a PIR and/or other passive presence sensor(s). In various implementations, one or more component(s) and/or function(s) of the automated assistant client 110 can be initiated responsive to a detection of human presence based on output from presence sensor(s) 105. For example, visual capture module 114 and/or speech capture module 112 can be activated only responsive to a detection of human presence, and can optionally be deactivated responsive to no longer detecting human presence. Also, for example, vision component(s) 107 and/or microphone(s) 109 can be activated only responsive to a detection of human presence, and can optionally be deactivated responsive to no longer detecting human presence. As yet another example, one or more (e.g., all) modules of adaptation engine 115 can be activated only responsive to a detection of human presence, and can optionally be deactivated responsive to no longer detecting human presence. In implementations that determine whether user(s) are engaged in conversation based on a duration and/or quantity of iteration(s) of determining whether any user is engaging in hot word free interaction with the automated assistant, the start of the duration and/or quantity of iterations can be from the activation responsive to detection of human presence.

In FIG. 1, adaptation engine 115 includes gaze module 1151, distance module 1152, mouth/voice module 1153, face recognition module 1154, one or more other module(s) 1155, and a conversation module 1156.

Adaptation engine 115 utilizes data from one or more of the modules 1151-1156 in determining whether to adapt one or more aspect(s) of the automated assistant 120. For example, adaptation engine 115 can, before initiating transmission of certain data (e.g., audio data detected at client device 101, text recognized from audio data locally at client device 101, and/or NLU data derived from the recognized text locally at client device 101) to cloud-based automated assistant component(s) 130 and/or before performing certain local processing (e.g., local ASR processing of audio data and/or local NLU processing based on local ASR results), require that certain condition(s) be determined to be satisfied. For instance, a condition can include that gaze measure(s), generated by gaze module 1151, indicate that a user's gaze is directed to the assistant device 101 and/or is persistently directed to the assistant device 101 (e.g., directed for at least X duration and/or for Y of Z analyzed image frames). In various implementations, adaptation engine 115 can, in determining whether the gaze measure(s) indicate that a user's gaze is directed to the assistant device 101, use either restrictive gaze parameter(s) or permissive gaze parameter(s). For example, restrictive gaze parameter(s) can be used when conversation module 1156 determines user(s) are engaged in a conversation, and permissive gaze parameter(s) can be used otherwise.

Also, for instance, a condition can additionally include that active speech measure(s), generated by mouth/voice module 1153, indicate that the same user (whose gaze is determined to be directed at the assistant device 101) is actively speaking. In various implementations, adaptation engine 115 can, in determining whether the active speech measures indicate whether the user is actively speaking, use either restrictive active speech parameter(s) or permissive active speech parameter(s). For example, restrictive active speech parameter(s) can be used when conversation module 1156 determines user(s) are engaged in a conversation, and permissive active speech parameter(s) used otherwise.

Condition(s) can additionally or alternatively include that distance measure(s), generated by distance module 1152, indicate that the same user is within a threshold distance of the assistant device. In various implementations, adaptation engine 115 can, in determining whether the distance measure(s) indicate whether the user is within the threshold distance, use either permissive distance parameter(s) or restrictive distance parameter(s), optionally in dependence on determination(s) by conversation module 1156. Condition(s) can additionally or alternatively include that data provided by face recognition module 1154 indicates that the same user is a registered user of the assistant device 101 (e.g., has an account stored on and/or in association with the assistant device 101).

Gaze module 1151 processes, using one or more gaze model(s) 1161, vision data from visual capture module 114 to generate gaze measure(s) that indicate whether a user's gaze is directed to the client device 101. As described herein, in some implementations the gaze module 1151 can process only human and/or face region(s) of vision data based on detection of those region(s) by an upstream module (which can be one of the other modules 1155) using an upstream detection and classification model (which can be one of the other models 1165 utilized by the other module(s) 1155).

In some implementations, gaze module 1151 generates, for each processed frame of vision data (e.g., image frame(s) that are each a crop of a respective user's face or eyes), a gaze measure that indicates a direction of the gaze in that frame. For example, each gaze measure can be a respective angle relative to a vision component that captured the frame of vision data. In some of those implementations, the adaptation engine 115 uses the direction, indicated by the gaze measure, and optionally a distance of the user from the client device 101 (e.g., as determined by distance module 1152), to determine if the gaze in the frame is directed within a gaze area defined by a gaze area parameter. The gaze area parameter can be a restrictive gaze area parameter or a permissive gaze area parameter. For example, the restrictive gaze area parameter can be utilized, in conjunction with the frame, based on the conversation module 1156 determining that the user and/or other user(s) in the environment are engaged in conversation.

In some implementations, gaze module 1151 additionally or alternatively generates, for each processed frame of vision data, a gaze measure that indicates a probability (e.g., a value from 0 to 1) of whether the frame includes a directed gaze. In such implementations, the gaze model(s) 1161 utilized can be, for example, a model trained based on training examples that include, as training example input, vision frame(s) (e.g., an image) and, as training example output, an indication of whether the image includes a directed gaze. For example, the training example output can be a single value that indicates whether directed gaze is present. For example, the single value can be a "0" when no directed gaze is present, a "1" when a gaze is present that is directed directly at, or within 5 degrees of (or other range, which may be dependent on a size of display 103). In some of those implementations, the adaptation engine 115 determines whether a directed gaze is present based on comparing the probability to a gaze measure threshold. The gaze measure threshold can be a permissive gaze measure threshold parameter or can be a restrictive gaze measure threshold. For example, the restrictive gaze measure threshold can be utilized, in conjunction with the frame, based on the conversation module 1156 determining that the user and/or other user(s) in the environment are engaged in conversation.

In various implementations, the adaptation engine 115 determines that a user's gaze is directed at the client device 101 only when gaze measure(s) for that user indicate gaze (e.g., direction of gaze is within gaze area of a gaze area parameter or gaze measure satisfies a gaze measure threshold) for at least a certain quantity of frames and/or a for certain duration as defined by a gaze persistence parameter. For instance, the gaze persistence parameter can define that the gaze must be directed within the gaze area for at least 65% (or other threshold percentage) consecutive image frames processed in determining gaze measures. The gaze persistence parameter can be a permissive gaze persistence parameter or can be a restrictive gaze persistence parameter. For example, the restrictive gaze persistence parameter can be utilized based on the conversation module 1156 determining that the user and/or other user(s) in the environment are engaged in conversation.

The mouth/voice module 1153 uses one or more mouth/voice machine learning models 1163 for generating active speech measure(s) that indicate whether a user's mouth is moving and/or whether, for a user, there is co-occurrence of mouth movement and voice activity. As described herein, in some implementations the mouth/voice module 1153 can process only human and/or face region(s) of vision data based on detection of those region(s) by an upstream module using an upstream detection and classification model.

In some implementations, the mouth/voice module 1153 generates only active speech measure(s) (e.g., one or more probabilities) that indicate whether a user's mouth is moving. In some implementations, the mouth/voice module 1153 additionally or alternatively generates active speech measure(s) that indicate whether there is co-occurrence of mouth movement and voice activity (e.g., whether there is mouth movement that temporally aligns with spoken output captured in audio data). In some of those implementations, the mouth/voice machine learning model 1163 that is utilized can be, for example, a neural network model, such as a transformer model or an RNN model that includes one or more memory layers. For example, the machine learning model can be a model trained to process vision data (e.g., vision data that includes a face region of the user) from visual capture module 114 and audio data from speech capture module 112, to generate an active speech measure that is a probability (a confidence metric) of whether the user captured in the vision data is actually speaking.

Training of such a machine learning model can be based on training examples that include, as training example input, a sequence of vision frames (e.g., sequence of images that include only face regions of a user) and a sequence of audio data frames. The sequence of audio data frames can temporally overlap with the sequence of vision frames, but the sequence of vision frames can optionally be of a different duration (e.g., shorter duration) than the sequence of audio data frames. The training examples can further include, as training example output, an indication of whether the sequences include mouth movement in combination with voice activity from the mouth that is moving. In other words, an indication of whether the user whose face is captured by the sequence of images is speaking. For example, the training example output can be a single value that indicates whether the user whose face is captured by the sequence of images is speaking. For instance, the single value can be a "0" if not, and a "1" if so. It is noted that such a model, trained on both vision data and overlapping audio data, can distinguish between: (1) voice activity that co-occurs with mouth movement and is the result of the mouth movement; and (2) voice activity that is not from the mouth movement, but just happens to co-occur with non-speaking mouth movement. For example, training examples can include those with training example input that includes non-speaking mouth movement in the vision data, and voice activity in the audio data (e.g. voice activity from another user, from a television, and/or from other source(s))—and that include training example output that indicates that the user whose face is captured by the sequence of images is not speaking.

The adaptation engine 115 determines whether active speech is present based on comparing the active speech measure(s) to an active speech measure threshold. The active speech measure threshold can be a permissive active speech measure threshold parameter or can be a restrictive active speech measure threshold parameter. For example, the restrictive active speech measure threshold parameter can be utilized based on the conversation module 1156 determining that the user and/or other user(s) in the environment are engaged in conversation.

Distance module 1152 processes vision data from visual capture module 114, and/or other sensor data, to generate a distance measure that indicates an estimated distance of a user. As described herein, in some implementations the distance module 1152 can process only human and/or face region(s) of vision data based on detection of those region(s) using an upstream detection and classification model. The distance module 1152 can optionally use one or more distance machine learning models 1162 in generating distance measures. Such a machine learning model can be, for example, a neural network model, such as a convolutional neural network (CNN) model. Training of such a CNN model can be based on training examples that include, as training example input, vision frame(s) (e.g., an image that includes only face and/or body regions of a single user) and, as training example output, value(s) that indicate a ground truth distance of the user. For instance, the training example output can be a one-hot vector, with the values of the vector each corresponding to a different distance (or range of distances), and the "hot" vector indicating a ground truth distance (or distance range). In other implementations, the distance module 1152 can optionally determine distance without direct utilization of a distance machine learning model 1162. For example, the distance module 1152 can be provided with vision data that includes only a face region determined to correspond to a user. Further, the distance module 1152 can estimate the distance of the user based on a distance between eyes of the user in the vision data (the location of the eyes can optionally be indicated by the upstream model), a head size of the user in the vision data, and/or other attribute(s) of the user in the vision data.

The adaptation engine 115 can determine whether a user is within a threshold distance of the client device 101 by comparing the distance measure(s) to a distance measure threshold. The distance speech measure threshold can be a permissive distance measure threshold parameter or can be a restrictive distance measure threshold parameter. For example, the restrictive distance measure threshold parameter can be utilized based on the conversation module 1156 determining that the user and/or other user(s) in the environment are engaged in conversation.

The face recognition module 1154 can use one or more face recognition machine learning models 1164 to determine whether there is an account associated with a face detected in vision data, and provide an indication of whether the face is associated with an account. For example, an indication of whether the face is associated with an account can be used by the adaptation engine 115 in determining whether to generate measure(s) for the face. For example, the adaptation engine 115 can, in some implementations, only generate measure(s) for face(s) that are associated with an account for the assistant device 101. As another example, the indication that the face is associated with an account can be used by the adaptation engine 115 in determining whether a corresponding user is engaged in hot word free interaction with the automated assistant. For example, the adaptation engine 115 can make determining engagement, by a user, in hot word free interaction with the automated assistant, contingent on there being an indication that a face of the user is associated with an account for the assistant device 101. As described herein, in some implementations the face recognition module 1154 can process only human and/or face region(s) of vision data based on detection of those region(s) using an upstream detection and classification model.

The face recognition module 1154 can optionally use one or more face recognition machine learning models 1164. Such a machine learning model can be for example, a neural network model, such as a CNN model and/or RNN model. In various implementations, image frame(s) are processed using the face recognition machine learning model(s) 1164 to generate one or more face embeddings, and the face embedding(s) are compared to locally stored embedding(s) for one or more user accounts/profiles registered with the client device 101. As reference above, in some implementations adapting one or more function(s), by the adaptation engine 115, can be contingent on the face recognition module 1154 determining a corresponding user is a recognized user (e.g., one registered with the automated assistant client 110). In some additional or alternative implementations, the account identifier associated with the recognized face can be compared to an account identifier determined based on text-independent speaker identification that is based on processing of audio data that captures a spoken utterance. In some of those implementations, certain processing and/or provisioning of a response to the spoken utterance can be contingent on the comparison indicating the same account identifiers. In these and other manners, it can be verified that the spoken utterance is provided by the same user that is also providing the directed gaze (as the face recognition can be performed on the user providing the directed gaze). This can prevent inadvertently generating and/or provisioning of a response to a spoken utterance that is from a user (or other source) that is not the user providing the directed gaze. The text-independent speaker identification can be performed by text-independent speaker identification (TI-SID) module 142 (described herein) which can be implemented at the cloud-based automated assistant component(s) 130, or optionally at the client device 101 itself.

Other module(s) 1155 can determine occurrence(s) of one or more other attribute(s), optionally utilizing one or more other machine learning models 1165. As one non-limiting example, other module(s) 1155 can include a face detection module, that detects face(s) in vision data frames, and can use an object detection model of other machine learning model(s) 1165. The detected face(s) can be used to generate vision data frames that are each a crop, of an underlying initial vision data frame, of a corresponding face. Such cropped vision data frames can be the ones processed by one or more of modules 1151, 1152, 1153, and 1154.

Conversation module 1156 can, at intervals (regular or irregular), determine whether there is currently a conversation situation in which at least one user, in an environment of the assistant device 101, is engaged in conversation with additional user(s). For example, the conversation module 1156 can, while adaptation engine 115 is monitoring for occurrence of hot word free engagement with the automated assistant, determine, at intervals, whether there is currently a conversation situation. The conversation module 1156 can provide, to the adaptation engine 115, an indication of whether there is a conversation situation. As described herein, when there is a conversation situation the adaptation engine 115 can use a restrictive parameter set in monitoring for occurrence of hot word free engagement with the automated assistant. Moreover, when there is not a conversation situation, the adaptation engine 115 can use a permissive parameter set in monitoring for occurrence of hot word free engagement with the automated assistant. Using the restrictive parameter set, relative to using the permissive parameter set, constrains the set of conditions that will result in the adaptation engine 115 determining that the user is engaging in hot word free interaction with the automated assistant.

The conversation module 1156 can utilize one or more techniques, optionally in parallel with one another, in determining whether there is a conversation situation. In some implementations, conversation module 1156 determines that at least one user is engaged in conversation as a function of determining that two or more users are co-present in an environment with the assistant device. In some versions of those implementations, conversation module 1156 determines that the at least one user is engaged in conversation additionally or alternatively based on one or more other factors. In some of those versions, the other factor(s) can include: detecting occurrence(s) of voice activity; properties of measure(s), that are used in determining whether there is engagement with an automated assistant; and/or a current duration or current quantity of iterations of determining whether a user is engaging in hot word free interaction with an automated assistant. In some implementations, the conversation module 1156 utilizes one or more conversation machine learning models 1166 in determining whether there is a conversation situation. For example, one or more of the preceding factor(s) can be processed, using a conversation machine learning model 1166, to generate a conversation measure that reflects a probability that a conversation is ongoing. The conversation module 1156 can determine that conversation is ongoing when the probability satisfies a threshold. Such a conversation machine learning model 1166 can be trained using training examples that each include training example input with corresponding factors and ground truth training example output that reflects whether conversation was occurring (e.g., "1" if so, "0" if not).

In some implementations, conversation module 1156 determines that at least one user is engaged in conversation as a function of determining that a user, in an environment with the assistant device, is participating in communication with user(s) that are not co-present in the environment. For example, conversation module 1156 can determine that the user is engaged in a phone call, a video call, or other communication session via an additional device that is in addition to the assistant device.

As one non-limiting example of adapting processing by adaptation engine 115, prior to adaptation engine 115 determining satisfaction of condition(s), ASR processing may not be performed at the client device 101 or any ASR processing results may only be temporarily buffered locally at the client device 101 (i.e., without local NLU processing of the ASR processing results or transmission of the ASR processing results to the cloud-based automated assistant component(s) 130). However, in response to determining the condition(s) are satisfied, the adaptation engine 115 can cause the local ASR processing to be performed (e.g., on temporarily buffered audio data and/or continuing audio data from a stream), cause local NLU processing of the ASR processing results to be performed, and/or cause ASR results and/or NLU results to be transmitted to cloud-based automated assistant component(s) 130. Further, the automated assistant client 110 or the cloud-based automated assistant component(s) 130 can fulfill a corresponding spoken request based on ASR processing results and/or NLU processing results. Thus, the need for the user to speak an explicit invocation phrase (e.g., "OK Assistant") in order to cause a spoken utterance of the user to be fully processed by the automated assistant 120 can be obviated. For instance, rather than the user needing to speak "OK Assistant, what's today's forecast" to obtain today's forecast, the user could instead: look at the client device 101, and speak only "what's today's forecast" during or temporally near (e.g., within a threshold of time before and/or after) looking at the client device 101. Also, for instance, rather than the user needing to speak "OK Assistant, open the garage door" to open his/her garage, the user could instead: look at the client device 101, and speak only "open the garage door" during or temporally near (e.g., within a threshold of time before and/or after) looking at the client device 101.

In some implementations, additional module(s) of the automated assistant client 110 can be provided. For example, additional module(s) can include a local ASR module that processes captured audio data, using an ASR model, to generate recognition(s) of a spoken utterance captured by the audio data. As another example, additional module(s) can include a local NLU module that processes ASR result(s) (e.g., a best recognition) and/or contextual data to generate NLU data that can include a structured semantic interpretation of the ASR results. As yet another example, additional module(s) can include a local fulfillment module that processes ASR results and/or NLU data to locally generate a response and/or perform other fulfillment(s) based on the natural language processing. In various implementations, the local speech processing, local natural language processing, and/or local fulfillment generation can be function(s) that are adapted by the adaptation engine 115. For example, local speech processing, local natural language processing, and/or local response generation can be dormant until the adaptation engine 115 determines one or more attribute(s) are occurring.

Cloud-based automated assistant components 130 can include one or more modules that complement any local module counterparts of automated assistant client and/or that are provided in lieu of any local module counterparts.

Cloud-based ASR module 132 can be configured to leverage the virtually limitless resources of the cloud to convert audio data captured by speech capture module 112 into text, which may then be provided to intent understanding module 135.

Cloud-based TTS module 131 can be configured to leverage the virtually limitless resources of the cloud to convert textual data (e.g., natural language responses formulated by automated assistant 120) into computer-generated speech output. In some implementations, TTS module 131 can provide the computer-generated speech output to client device 101 to be output directly, e.g., using one or more speakers. In other implementations, textual data (e.g., natural language responses) generated by automated assistant 120 may be provided to client device 101, and a local TTS module of client device 101 can then convert the textual data into computer-generated speech that is output locally.

Automated assistant 120 (e.g., cloud-based automated assistant components 130) can include an intent understanding module 135, the aforementioned TTS module 131, the aforementioned ASR module 132, and other components that are described in more detail herein. In some implementations, one or more of the modules and/or modules of automated assistant 120 may be omitted, combined, and/or implemented in a component that is separate from automated assistant 120. In some implementations one or more of the components of automated assistant 120, such as intent understanding module 135, TTS module 131, ASR module 132, etc., may be implemented at least on part on client device 101 (e.g., in combination with, or to the exclusion of, the cloud-based implementations).

NLU module 133 of intent understanding module 135 processes natural language input generated by user(s) via client device 101 and may generate annotated output (e.g., in textual form) for use by one or more other components of automated assistant 120. For example, the NLU module 133 can process recognized text from ASR, of a spoken utterance, performed at the client device 101 and/or at the cloud-based automated assistant component(s) 130. The generated annotated output includes one or more annotations of the natural language input and one or more (e.g., all) of the terms of the natural language input.

In some implementations, the NLU module 133 is configured to identify and annotate various types of grammatical information in natural language input. In some implementations, the NLU module 133 may additionally and/or alternatively include an entity tagger (not depicted) configured to annotate entity references in one or more segments such as references to people, organizations, locations, and so forth. In some implementations, the NLU module 133 can additionally and/or alternatively include a coreference resolver (not depicted) configured to group, or "cluster," references to the same entity based on one or more contextual cues. In some implementations, one or more components of the NLU module 133 can rely on annotations from one or more other components of the NLU module 133.

Intent understanding module 135 can also include an intent matcher 134 that is configured to determine an intent of a user engaged in an interaction with automated assistant 120. While depicted separately from NLU module 133 in FIG. 1, in other implementations, intent matcher 134 may be an integral part of NLU module 133 (or more generally, of a pipeline that includes natural language processor 133). In some implementations, NLU module 133 and intent matcher 134 may collectively form the aforementioned intent understanding module 135.

Intent matcher 134 can use various techniques to determine an intent of the user and, optionally, value(s) for slot(s)/parameter(s) of the intent, e.g., based on output from NLU module 133 (which may include annotations and terms of the natural language input) and/or based on other contextual data. In some implementations, intent matcher 134 may have access to one or more databases (not depicted) that include, for instance, a plurality of mappings between grammars and responsive actions (or more generally, intents), visual cues and responsive actions, and/or touch inputs and responsive actions. In addition to or instead of grammars, in some implementations, intent matcher 134 can employ one or more trained machine learning models, alone or in combination with one or more grammars, visual cues, and/or touch inputs. These trained machine learning models can also be stored in one or more databases and may be trained to identify intents, e.g., by embedding data indicative of a user's utterance and/or any detected user-provided visual cues into a reduced dimensionality space, and then determining which other embeddings (and therefore, intents) are most proximate, e.g., using techniques such as Euclidean distance, cosine similarity, etc.

In some implementations, automated assistant 120 may facilitate (or "broker") transactions between users and agents, which may be independent software processes that receive input and provide responsive output. Some agents may take the form of third party applications that may or may not operate on computing systems that are separate from those that operate, for instance, cloud-based automated assistant components 130. One kind of user intent that may be identified by intent matcher 134 is to engage a third party application. For example, automated assistant 120 may provide access to an application programming interface ("API") to a pizza delivery service. A user may invoke automated assistant 120 and provide a command such as "I'd like to order a pizza." Intent matcher 134 may map this command to a grammar that triggers automated assistant 120 to engage with the third party pizza delivery service. The third party pizza delivery service may provide automated assistant 120 with a minimum list of slots that need to be filled in order to fulfill a pizza delivery order. Automated assistant 120 may generate and provide to the user (via client device 101) natural language output that solicits parameters for the slots.

Fulfillment module 138 can be configured to receive the predicted/estimated intent that is output by intent matcher 134, as well as an associated slot values (whether provided by the user proactively or solicited from the user) and fulfill (or "resolve") the intent. In various implementations, fulfillment (or "resolution") of the user's intent may cause various fulfillment information (also referred to as "responsive" information or data) to be generated/obtained, e.g., by fulfillment module 138. In some implementations, fulfillment module 138 can additionally or alternatively at least selectively operate directly on recognized text from ASR results. For example, some recognized text can be mapped directly to corresponding action(s) and/or response(s) for the recognized text, and fulfillment module 138 can utilize the mapping in determining a fulfillment based directly on recognized text.

Fulfillment information can take various forms because intents can be fulfilled in a variety of ways. Suppose a user requests pure information, such as "Where were the outdoor shots of 'The Shining' filmed?" The intent of the user can be determined, e.g., by intent matcher 134, as being a search query. The intent and content of the search query may be provided to fulfillment module 138, which as depicted in FIG. 1 can be in communication with one or more search modules 150 configured to search corpuses of documents and/or other data sources (e.g., knowledge graphs, etc.) for responsive information. Fulfillment module 138 can provide data indicative of the search query (e.g., the text of the query, a reduced dimensionality embedding, etc.) to search module 150. Search module 150 can provide responsive information, such as GPS coordinates, or other more explicit information, such as "Timberline Lodge, Mt. Hood, Oregon." This responsive information can form part of the fulfillment information generated by fulfillment module 138.

Additionally or alternatively, fulfillment module 138 can be configured to receive, e.g., from intent understanding module 135, a user's intent and any slot values provided by the user or determined using other means (e.g., GPS coordinates of the user, user preferences, etc.) and trigger a responsive action. Responsive actions can include, for instance, controlling a smart device, ordering a good/service, starting a timer, setting a reminder, initiating a phone call, playing media, sending a message, initiating a routine of multiple actions, etc. In some such implementations, fulfillment information may include slot values associated with the fulfillment, confirmation responses (which may be selected from predetermined responses in some cases), etc.

Natural language generator 136 can be configured to generate and/or select natural language output (e.g., words/ phrases that are designed to mimic human speech) based on data obtained from various sources. In some implementations, natural language generator 136 may be configured to receive, as input, fulfillment information associated with fulfillment of an intent, and to generate natural language output based on the fulfillment information. Additionally or alternatively, natural language generator 136 can receive information from other sources, such as third party applications, which it may use to compose natural language output and/or other content for rendering to the user via automated assistant client 110.

Semantic filter module 140 can determine whether a spoken utterance is intended for the assistant 120. The fulfillment module 138 can utilize output from semantic filter module 140 in determining whether to generate and/or provide a response responsive to a spoken utterance. For example, the semantic filter module 140 can provide a confidence metric that indicates likelihood that the spoken utterance is intended for the assistant 120, and the fulfillment module 138 can determine whether to generate and/or provide a response based on the confidence metric from semantic filter module 140. The confidence metric from semantic filter module 140 can optionally be considered in combination with one or more other confidence metrics, such as metric(s) from adaptation engine 115 and/or TI-SID module 142. Although semantic filter module 140 is illustrated in FIG. 1 as being implemented by the cloud-based automated assistant component(s) 130, in various implementations it can additionally or alternatively be implemented as one of the modules of adaptation engine 115, and utilized in determining whether to adapt one or more assistant functions.

In some implementations, the semantic filter module 140 utilizes one or more semantic machine learning models 141 in determining whether a spoken utterance is intended for the assistant 120. In some of those implementations, the semantic machine learning model(s) 141 can process audio data corresponding to a spoken utterance, text output from the ASR module 132, and/or output from the intent understanding module 135 in determining a confidence metric that a spoken utterance and/or detected gesture is intended for the assistant 120. Generally, for spoken utterances that have corresponding text and/or NLU output that are atypical (or non-occurring) for assistant inputs, the confidence metric should be low. For example, if the text does not conform to any patterns for assistant input, the confidence metric should be low. Additionally or alternatively, if the NLU output would result in no assistant response, or a "punt" response or merely a "personality" response, the confidence metric should be low. Moreover, the audio data itself can indicate whether the input is intended as an assistant input as user's often speak with different voice attribute(s) (e.g., inflection, tone, cadence) when speaking to an assistant device (as compared to those voice attribute(s) when speaking to another human).

TI-SID module 142 processes, using TI-SID machine learning model 143, audio data that contains a spoken utterance to determine if the spoken utterance is from the same user that adaptation engine 115 determined is engaging in hot word free interaction with the automated assistant. For example, TI-SID module 142 can process audio data that captures the spoken utterance, using a TI-SID model, to generate a TI-SID embedding and compare that TI-SID embedding to pre-stored TI-SID speaker embedding(s) for account(s) of the client device 101. If the TI-SID embedding is determined to satisfy a similarity threshold for a pre-stored speaker embedding of an account, the TI-SID module 142 can determine the spoken utterance is from a user corresponding to the account. Further, the TI-SID module 142 can determine whether that account is the same as the account for the user determined, by adaptation engine 115, to be currently engaging in hot word free interaction with the automated assistant. If so, the spoken utterance can be fully processed by the automated assistant and fulfilled. If not, the certain processing can be prevented and/or halted certain processing and/or fulfillment suppressed. For example, the TI-SID module 142 can prevent fulfillment module 138 from generating and/or provisioning a response if they are not the same. In these and other manners, it can be verified that the spoken utterance is provided by the same user that is determined to be engaging in hot word free interaction with the automated assistant 120. This can prevent inadvertently generating and/or provisioning of a response to a spoken utterance that is from a user (or other source) that is not the user determined to be engaging in hot word free interaction with the automated assistant 120. Although illustrated in FIG. 1 as being implemented at the cloud-based automated assistant component(s) 130, the TI-SID module 142 can optionally be implemented at the client device 101 as part of adaptation engine 115, and utilized in determining whether to adapt assistant function(s).

Figure 2:
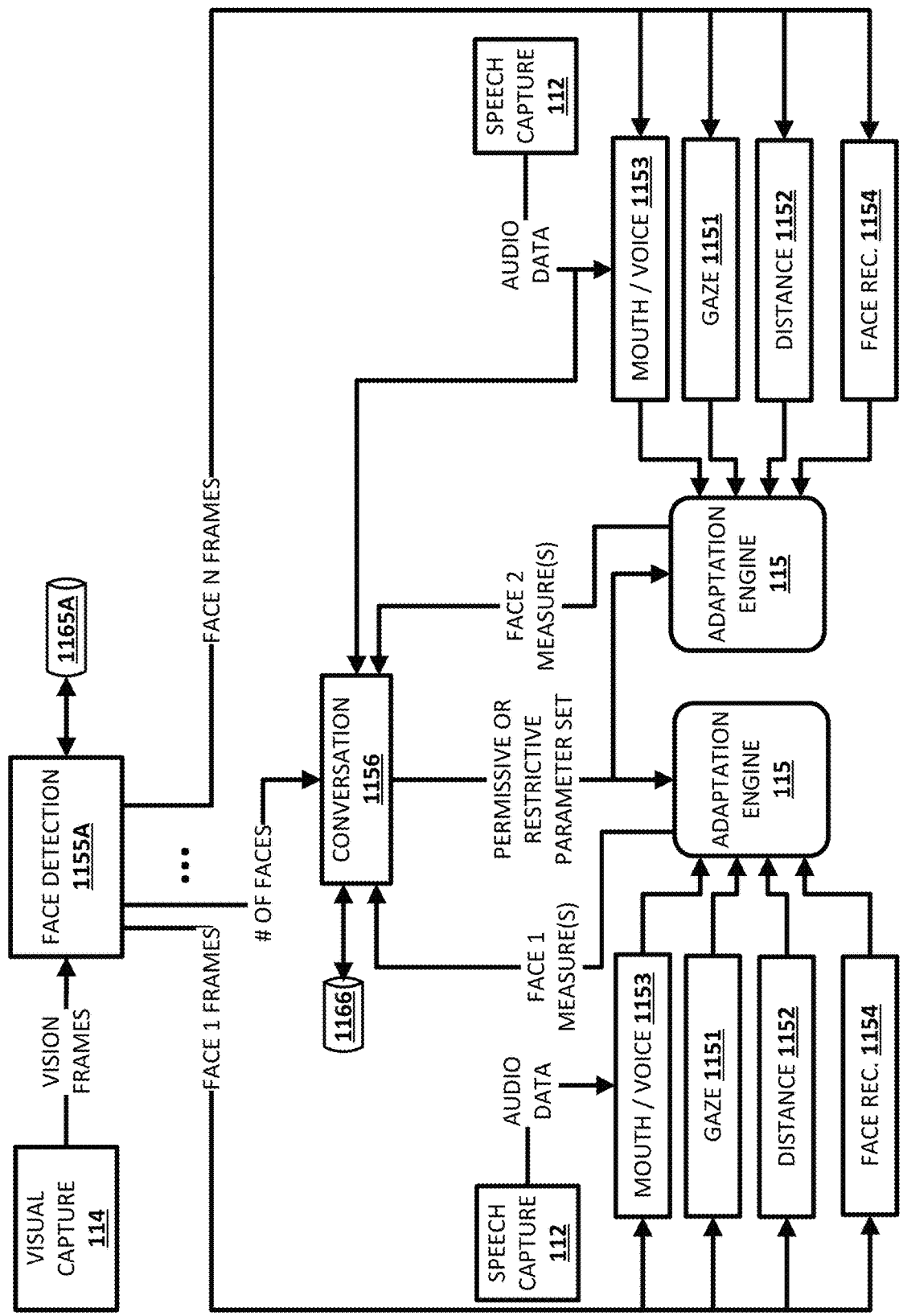
FIG. 2 depicts an example process flow that demonstrates various aspects of the present disclosure, in accordance with various implementations.

Referring now to FIG. 2, some component(s) of FIG. 1 are illustrated, along with example interaction(s) that can occur amongst those components. In FIG. 2, visual capture module 114 provides vision frames to a face detection module 1155A, which is an example module of other module(s) 1155 of FIG. 1. The face detection module 1155A utilizes a detection model 1165A, of other model(s) 1165 of FIG. 1, to detect face(s), if any, in each of the vision frame(s). The face detection module 1155A can track face(s) over each of multiple vision frames to determine that a face detected in a later vision frame corresponds to a corresponding face of an earlier frame. For each detected face in a vision frame, the face detection module 1155A can generate a corresponding cropped vision frame, that is a crop of the face, and provide the cropped vision frame to additional components. For example, in FIG. 2 "face 1 frames" indicates cropped vision frames that capture a first face and "face N frames" indicates cropped vision frames that capture an Nth face. As indicated by the horizontal ellipsis, additional cropped vision frames can be provided in situations where there are more than two detected faces. In implementations where there is only a single detected face, only the face 1 frames will be provided. The face detection module 1155A can also provide, to conversation module 1156, an indication of a quantity of detected faces in vision frame(s). For example, the quantity of detected faces currently being tracked by face detection module 1155A (e.g., the quantity of unique faces detected over the last 15 seconds or other threshold duration).

The gaze module 1151 processes the face 1 frames to generate gaze measure(s) and provides the gaze measure(s) to adaptation engine 115. The distance module 1152 processes the face 1 frames to generate distance measure(s) and provides the distance measure(s) to adaptation engine 115.

The mouth/voice module 1153 processes the face 1 frames, and audio data captured by speech capture module 112, to generate active speech measure(s), and provides the active speech measure(s) to adaptation engine 115. It is noted that a stream of face 1 frames can be provided, based on a stream of vision frames, and continually processed by the modules 1151, 1152, and 1153 (optionally at different rates) to generate respective streams of measure(s) that are provided to the adaptation engine 115.

The face recognition module 1154 processes at least one of the face 1 frames and determines whether a face, captured in the face 1 frames, corresponds to any account registered with the assistant device 101 and provides, to adaptation engine 115, an indication of whether the face corresponds to any registered account. In some implementations, the adaptation engine 115 will not find that the face 1 user is engaging in hot word free interaction with the automated assistant unless it receives, from face recognition module 1154, an indication that the face 1 frames correspond to a registered account. In some implementations, if the face recognition module 1154 determines that a face captured by cropped vision frame(s) does not correspond to any registered account (e.g., an embedding generated based on the cropped vision frames does not satisfy a distance threshold relative to pre-stored embedding(s) of registered account(s)), then module(s) 1151, 1152, and/or 1153 can bypass performing any processing on such cropped vision frames. Put another way, in those implementations unrecognized face(s) are not processed at all in determining whether their corresponding user(s) are engaging in hot word free interaction with the automated assistant 120.

The adaptation engine 115 processes the gaze, distance, and active speech measures generated based on the face 1 frames in determining whether condition(s) are satisfied that indicate that the user (corresponding to the face 1 frames) is engaging in hot word free interaction with the automated assistant 120. In doing so, the adaptation engine 115 utilizes one or more parameter(s) in processing the measures. When the adaptation engine 115 determines the condition(s) are satisfied, the adaptation engine 115 can automatically adapt automated assistant processing as described herein.

The parameter(s) that are used by the adaptation engine 115 are those of a permissive parameter set or are those of a restrictive parameter set. Whether the permissive or restrictive parameter set is utilized at a given iteration by the adaptation engine 115 is dependent on a most recent indication, from conversation module 1156, of whether the permissive or restrictive parameter set should be utilized.

The gaze module 1151 also processes the face N frames to generate gaze measure(s) and provides the gaze measure(s) to adaptation engine 115. The distance module 1152 also processes the face N frames to generate distance measure(s) and provides the distance measure(s) to adaptation engine 115. The mouth/voice module 1153 also processes the face N frames, and audio data captured by speech capture module 112, to generate active speech measure(s), and provides the active speech measure(s) to adaptation engine 115. The face recognition module 1154 processes at least one of the face N frames and determines whether a face, captured in the face N frames, corresponds to any account registered with the assistant device 101 and provides, to adaptation engine 115, an indication of whether the face corresponds to any registered account. In some implementations, the adaptation engine 115 will not find that the face N user is engaging in hot word free interaction with the automated assistant unless it receives, from face recognition module 1154, an indication that the face N frames correspond to a registered account. It is noted that a stream of face N frames can be provided, based on a stream of vision frames, and continually processed by the modules 1151, 1152, and 1153 (optionally at different rates) to generate respective streams of measure(s) that are provided to the adaptation engine 115.

The adaptation engine 115 processes the gaze, distance, and active speech measures generated based on the face N frames in determining whether condition(s) are satisfied that indicate that another user (corresponding to the face N frames) is engaging in hot word free interaction with the automated assistant 120. When the adaptation engine 115 determines the condition(s) are satisfied, the adaptation engine 115 can automatically adapt automated assistant processing as described herein.

The parameter(s) that are used by the adaptation engine 115 are those of a permissive parameter set or are those of a restrictive parameter set. Whether the permissive or restrictive parameter set is utilized at a given iteration by the adaptation engine 115 is dependent on a most recent indication, from conversation module 1156, of whether the permissive or restrictive parameter set should be utilized.

The conversation module 1156 can determine, at intervals, whether there is a conversation situation and, if so, dictate use of the restrictive parameter set and, otherwise dictate use of the permissive parameter set. In some implementations, in determining whether there is a conversation situation, the conversation module can make the determination as a factor of a most recent indication of the quantity of faces (provided by face detection module 1155A) and/or as a factor of most recent measure(s) from module(s) 1151, 1152, and/or 1153. The measure(s) can include those from processing the face 1 frames, those from processing the face N frames, and/or those from processing additional face(s) frames. Optionally, the measure(s) and/or the quantity is processed, by the conversation module 1156 and using a conversation machine learning model 1166, to generate a probability or other measure that indicates whether there is a conversation situation—and the conversation module 1156 determines whether there is a conversation based on the probability.

Figure 3:
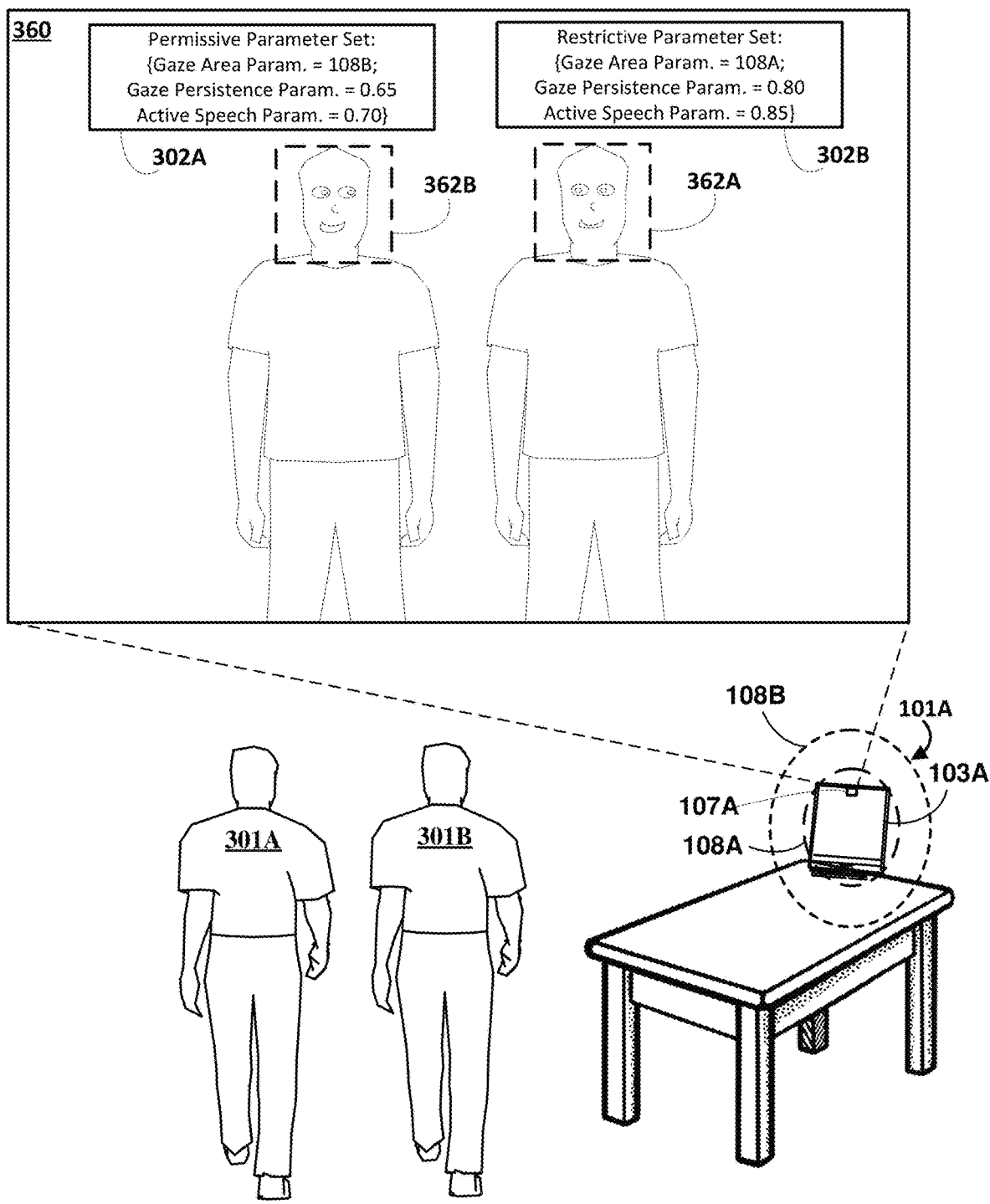
FIG. 3 depicts an example of an assistant device and two users, depicts an image captured by a camera of the assistant device, and illustrates two separate example gaze areas.

FIG. 3 depicts an example of client device 101, a display 103, and a vision component 107 of FIG. 1. In FIG. 3, the example client device is denoted as 101A, the example display 103 is denoted as 103A, and the example vision component 107 is denoted at 107A. The client device 101A can further includes speaker(s) and microphone(s).

FIG. 3 also depicts examples of two separate gaze areas. A restrictive gaze area is the area encompassed by first dashed ellipse 108A and a permissive gaze area is the area encompassed by second dashed ellipse 108B. Additional or alternative gaze areas can be defined, such as those having non-elliptical bounds. Moreover, in various implementations gaze area parameter(s) can be omitted and/or distinct restrictive and permissive gaze area parameter(s) can be omitted.

FIG. 3 also depicts a first user 301A and a second user 301B that are positioned in front of the client device 101A and engaged in a conversation with one another. FIG. 3 also depicts an example image 360 captured by the camera 107A when the users are positioned in front of the client device 101A and engaged in conversation with one another. In image 360, a bounding box 362A is provided and represents a region of the image that can be determined (e.g., by face detection module 1155A of FIG. 2) to correspond to a face of the first user 301A. Likewise, a bounding box 362B is provided and represents a region of the image that can be determined to correspond to a face of the second user 301B. In some implementations, one or more module(s) of adaptation engine 115 operating on client device 101A can process cropped images that correspond to the bounding box 362A portion of the image (or focus attention on that portion) in generating gaze, active speech, and/or distance measure(s) for the first user 301A. Likewise, module(s) of adaptation engine 115 operating on client device 101A can process cropped images that correspond to the bounding box 362B portion of the image (or focus attention on that portion) in generating gaze, active speech, and/or distance measure(s) for the second user 301B. Although only a single image is depicted in FIG. 3, in various implementations generating various measures can be based on a sequence of images as described herein. Moreover, although only two users are depicted in FIG. 3, only a single user or more than two users could be captured in image(s) and in various implementations corresponding measures can be generated for each of the user(s) and processed in determining whether the corresponding user is engaging in hot word free interaction with the automated assistant.

Also illustrated in FIG. 3 is an example permissive parameter set 302A and an example restrictive parameter set 302B. As described herein, the adaptation engine 115 can utilize either the permissive parameter set 302A or the restrictive parameter set 302B in processing measure(s) generated for the first user 301A and measure(s) generated for the second user 301B, in determining whether certain condition(s) are satisfied that indicate either of the users 301A or 301B is engaging in hot word free interaction with the automated assistant.

The permissive parameter set 302A includes a permissive gaze area parameter that corresponds to the larger permissive gaze area indicated by the second dashed ellipse 108B. The permissive parameter set 302A also include a permissive gaze persistence parameter of 0.65 (e.g., 65% of N consecutive analyzed frames must indicate a gaze) and a permissive active speech parameter of 0.70 (e.g., probability of active speech must be equal to or greater than 0.70).

The restrictive parameter set 302B includes a restrictive gaze area parameter that corresponds to the smaller restrictive gaze area indicated by the first dashed ellipse 108A. The restrictive parameter set 302B also include a restrictive gaze persistence parameter of 0.80 (e.g., 80% of N consecutive analyzed frames must indicate a gaze) and a restrictive active speech parameter of 0.85 (e.g., probability of active speech must be equal to or greater than 0.85).

Figure 4A:
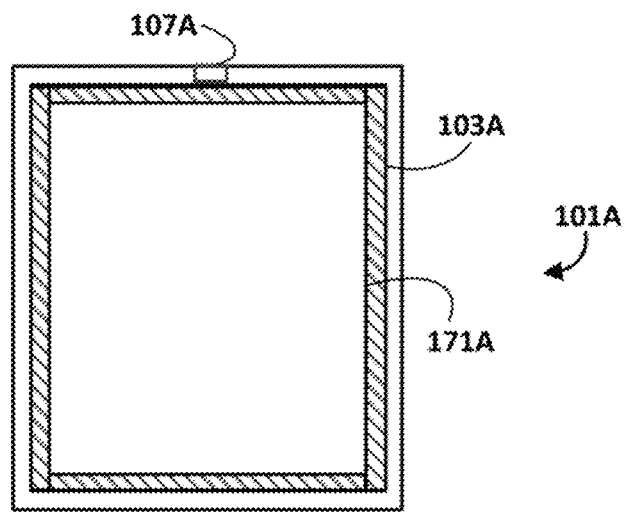
FIG. 4A and FIG. 4B illustrate the assistant device of FIG. 3, and two examples of visual cues that can be rendered to indicate, to users, whether a restrictive parameter set or a permissive parameter set is being utilized.
Figure 4B:
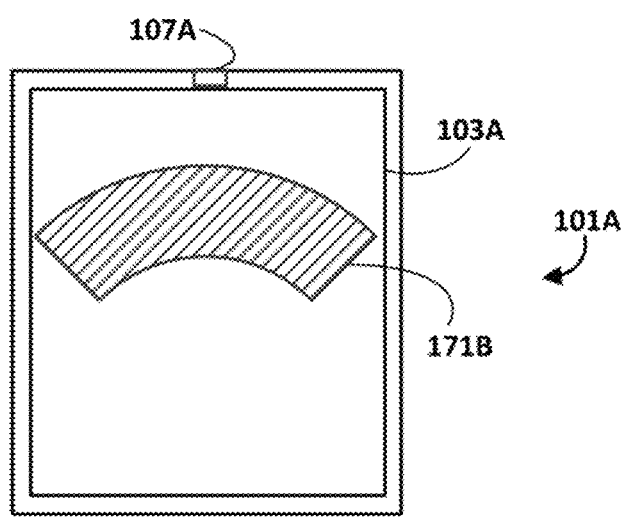

FIGS. 4A and 4B illustrate the assistant device 101A of FIG. 3, and two examples of visual cues that can be rendered, on the display 103A, to indicate, to users, whether a restrictive parameter set or a permissive parameter set is being utilized.

In FIG. 4A, a first visually perceptible cue is rendered by the display 103A and is indicated by shading 171A. The first visually perceptible cue can be a white (or other color(s)) glow around the periphery of the display 103A an can optionally be displayed along with other content being rendered by the display 103A (e.g. an ambient picture, a weather forecast, upcoming event(s), etc.). In some implementations, the first visually perceptible cue is caused to be rendered, by the adaptation engine 115, in response to the adaptation engine 115 processing sensor data (e.g., image frame(s) and/or audio data frame(s)) in monitoring for occurrence of a user engaging in hot word free interaction with an automated assistant—and when a permissive parameter set is being utilized. For example, the first visually perceptible cue can be caused to be rendered for at least X duration when such processing is initiated with the permissive parameter set and, optionally, can be rendered for the entire duration that such processing is ongoing and is utilizing the permissive parameter set.

In FIG. 4B, a second visually perceptible cue is rendered by the display 103A and is indicated by shading 171B. The second visually perceptible cue be a multicolor (or other color(s)) arcuate shape rendered across a portion of the display 103A, and can optionally be rendered atop other content rendered by the display 103A. Optionally, the third visually perceptible cue can be partially transparent to enable continued viewing of other content rendered by the display 103A. In some implementations, the first visually perceptible cue is caused to be rendered, by the adaptation engine 115, in response to the adaptation engine 115 processing sensor data (e.g., image frame(s) and/or audio data frame(s)) in monitoring for occurrence of a user engaging in hot word free interaction with an automated assistant—and when a restrictive parameter set is being utilized. For example, the second visually perceptible cue can be caused to be rendered for at least X duration when such processing is initiated with the restrictive parameter set and, optionally, can be rendered for the entire duration that such processing is ongoing and is utilizing the restrictive parameter set.

By rendering the second visually perceptible cue, the user can be informed that a more restrictive parameter set is being utilized. As a result, the user can know that, to engage the automated assistant without a hot word, the user will need to, for example, provide a more persistent gaze and/or a gaze directed to a more constrained gaze area. Accordingly, rendering of the second visually perceptible cue can guide interaction of the user with the automated assistant. Also, by rendering the first visually perceptible cue, the user can be informed that a less restrictive parameter set is being utilized. As a result, the user can know that engaging the automated assistant without a hot word will be easier relative to if the restrictive parameter set were instead being utilized. Further, the user can, if not intending to engage the automated assistant, reposition their gaze and/or pose to mitigate risk of inadvertently engaging the automated assistant. Accordingly, rendering of the first visually perceptible cue can additionally or alternatively guide interaction of the user with the automated assistant.

Although FIGS. 4A and 4B illustrate particular visually perceptible cues, additional or alternative cues can be provided. For example, the text "permissive" and/or a circle can be visually rendered in lieu of shading 171A of FIG. 4A. Also, for example, the text "restrictive" and/or a square can be visually rendered in lieu of shading 171B of FIG. 4B. Also, although FIGS. 4A and 4B illustrate a first visually perceptible cue when permissive parameters are being utilized and a second visually perceptible cue when restrictive parameters are being utilized, in other implementations no visually perceptible cue is rendered when the permissive parameters are being utilized, but a visually perceptible cue is rendered when the restrictive parameters are being utilized.

Figure 5:
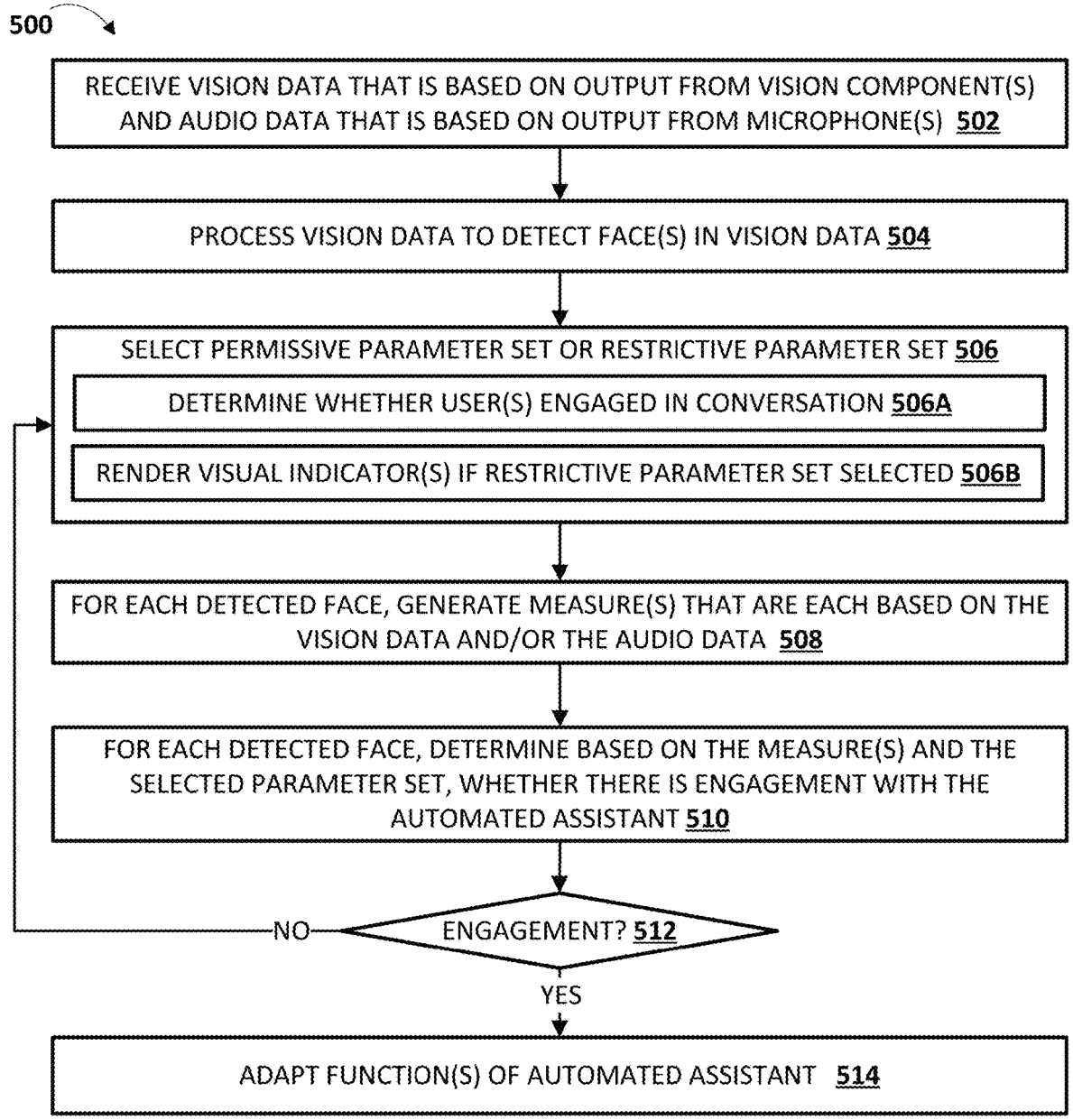
FIG. 5 is a flowchart illustrating an example method of dynamically adapting parameter(s) utilized in determining whether a user is engaging in hot word free interaction with the automated assistant.

FIG. 5 is a flowchart illustrating an example method 500 of dynamically adapting parameter(s) utilized in determining whether a user is engaging in hot word free interaction with the automated assistant. For convenience, the operations of the flow chart of FIG. 5 are described with reference to a system that performs the operations. This system can include various components of various computer systems, such as one or more components of computing system(s) that implement automated assistant 120 (e.g., a client device and/or remote computing system(s)). Moreover, while operations of the methods are shown in a particular order, this is not meant to be limiting. One or more operations may be reordered, omitted or added.

At block 502, the system receives vision data that is based on output from vision component(s) of an assistant device and audio data that is based on output from microphone(s) of the assistant device.

At block 504, the system processes the vision data to detect face(s) in the vision data.

At block 506, the system selects either a permissive parameter set or a restrictive parameter set. In some implementations, block 506 includes sub-block 506A and/or sub-block 506B.

At sub-block 506A, the system determines whether user(s), captured in the vision data and/or the audio data, are engaged in conversation. In some of those implementations, the system, at block 506, selects the restrictive parameter set if, at sub-block 506A, user(s) are determined to be engaged in conversation. Otherwise, the system selects the permissive parameter set at block 506. The system can use one or more techniques, optionally in parallel with one another, in determining whether user(s) are engaged in conversation. In some implementations, the system determines whether user(s) are engaged in conversation as a function of: a quantity of users determined to be co-present in an environment with the assistant device; detecting occurrence(s) of voice activity; properties of measure(s), that are used in determining whether there is engagement with an automated assistant; and/or a current duration or current quantity of iterations of determining whether a user is engaging in hot word free interaction with an automated assistant. In some implementations, the system determines whether user(s) are engaged in conversation additionally or alternatively as a function of determining whether a user is engaged in a phone call, a video call, or other communication session via an additional device that is in addition to the assistant device.

At sub-block 506B, the system renders one or more visual indicators if the restrictive parameter is selected. For example, the visual indicator(s) can be rendered via a display of the assistant device.

At block 508, for each detected face in vision data, the system generates measure(s) that are each based on the vision data and/or the audio data. For example, for a first detected face, the system can generate first gaze measure(s) based on first vision data frame(s) that capture the first face (e.g., that are each a crop of the first face) and generate first active speech measure(s) based on such first vision data frames and, optionally, temporally correlated audio data frames. Also, for example, for a second detected face, the system can generate second gaze measure(s) based on second vision data frame(s) that capture the second face (e.g., that are each a crop of the second face) and generate second active speech measure(s) based on such second vision data frames and, optionally, temporally correlated audio data frames At block 510, the system determines, for each detected face, whether there is engagement with the automated assistant. The system determines whether there is engagement for a face based on the measures generated for the face at block 508 and the parameter set selected in a most recent iteration of block 506 (i.e., the permissive parameter set or the restrictive parameter set). For example, in determining whether there is engagement for a first face, first gaze measure(s) can be compared to gaze parameter(s) for the selected parameter set. For instance, the system can compare the first gaze measure(s) to the gaze parameter(s) to determine whether the first user's gaze is directed at the assistant device and, optionally, whether it is persistently directed at the assistant device. Determining that there is engagement for the first face can be contingent on determining that the first user's gaze is directed at the assistant device and, optionally, is persistently directed at the assistant device.

At block 512, if the system determined, at a most recent iteration of block 510, that there is engagement with the automated assistant, the system proceeds to block 514. If not, the system can proceed back to block 506 to again select either the permissive parameter set or the restrictive parameter set, then proceed again to block 508 to generate additional measure(s) based on newly detected additional vision data and/or additional audio data, and then proceed again to block 510 (using most recently generated measure(s) and most recently selected parameter set). This general process can continue until engagement is determined and/or other condition(s) are satisfied (e.g., if presence of person(s) is no longer detected, method 500 can halt). It is noted that blocks 506, 508, and 510 are shown in sequence in FIG. 5 for ease of explanation. However, in various implementations all or aspects of one or more blocks can be performed in parallel and/or at different frequencies relative to other aspect(s) of other block(s). For example, block 506 can be performed in parallel with blocks 508 and/or 510 and, optionally, at a lesser frequency than blocks 508 and/or 510.

At block 514, the system adapts one or more function(s) of an automated assistant based on determining the engagement. The adaptation of the function(s) can, in various implementations, include initiating certain automated assistant processing that, prior to adaptation, was dormant. For example, the function(s) that are adapted can include the initiation of automatic speech recognition (ASR) (e.g., local ASR at the assistant device), natural language understanding (NLU) (e.g., NLU at the assistant device and/or at remote server(s) based on ASR results from local ASR), fulfillment based on the ASR and/or NLU results (e.g., at the assistant device and/or remote servers), and/or transmission of data to remote server(s) (e.g., transmission of ASR results, audio data, and/or vision data).

Figure 5A:
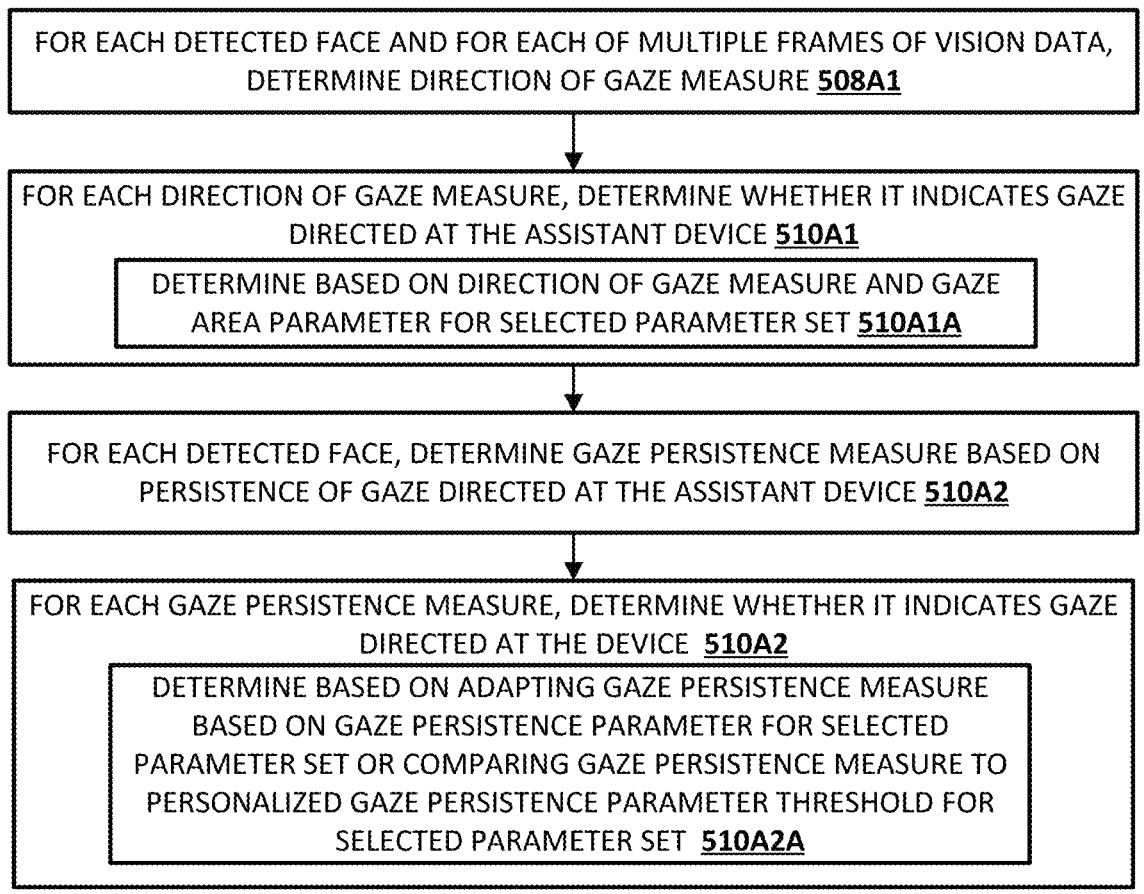
FIG. 5A depicts a flowchart illustrating an example of performing all or aspects of blocks 508 and 510 of FIG. 5.
Figure 5B:
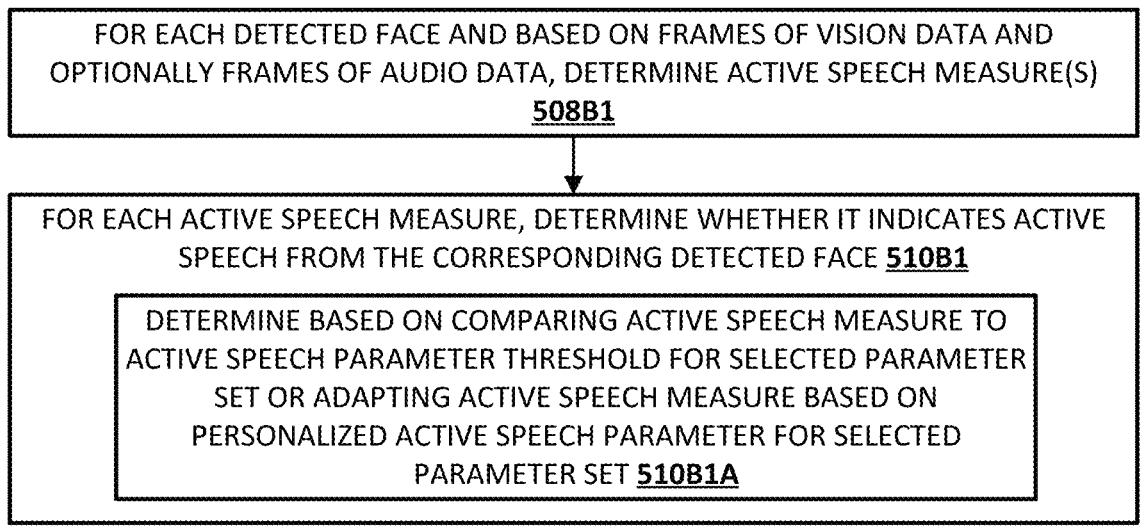
FIG. 5B depicts a flowchart illustrating another example of performing all or aspects of blocks 508 and 510 of FIG. 5.

Turning now to FIGS. 5A and 5B, FIG. 5A depicts a flowchart illustrating an example of performing all or aspects of blocks 508 and 510 of FIG. 5 and FIG. 5B depicts a flowchart illustrating another example of performing all or aspects of blocks 508 and 510 of FIG. 5. Although illustrated separately, in some implementations blocks of 5A and blocks of 5B can both be performed (e.g., in parallel) in performing blocks 508 and 510 of FIG. 5. Further, in various implementations, block 508 can include generating additional or alternative measure(s) and block 510 can include considering such additional or alternative measure(s) (and optionally corresponding restrictive or permissive parameter(s)) in determining whether there is engagement. For example, distance measure(s) can additionally be determined in block 508 and considered in block 510.

In FIG. 5A, blocks 508A1 and 508A2 are examples of aspect(s) of block 508, and blocks 510A1 and 510A2 are examples of aspect(s) of block 510.

At block 508A1, the system determines, for each detected face and for each of multiple frames of vision data, a direction of gaze measure.

At block 510A1, the system determines, for each direction of gaze measure, whether it indicates gaze directed at the assistant device. In some implementations, block 510A1 includes sub-block 510A1A in which the system determines whether a direction of gaze measure, for a face, indicates gaze directed at the device based on the direction of gaze measure and a gaze area parameter for the selected parameter set (i.e., selected in a most recent iteration of block 506 of method 500). For example, the direction of gaze and, optionally, a distance of the corresponding user from the camera, can be used to determine if the gaze in the image is directed within a gaze area that is defined by the gaze area parameter for the selected parameter set.

At block 508A2, the system determines, for each detected face, a gaze persistence measure based on persistence of the gaze, of the face, directed at the assistant device. The system can determine the gaze persistence measure based on a quantity of vision frames for which a gaze directed at the device was determined for the face and/or based on a duration of a gaze being determined for the face. For example, via iteration(s) of block 510A1 it can be determined that, for a given face, nine of ten consecutive analyzed frames are determined to have a gaze of the face directed at the assistant device. In such an example, the system can determine a gaze persistence measure of 0.90 for the given face.

At block 510A2, the system determines, for each gaze persistence measure, whether it indicates gaze directed at the assistant device. For example, the system can compare the gaze persistence measure to a gaze persistence measure threshold, and determine gaze is directed at the assistant device only if the gaze persistence measure satisfies the gaze persistence measure threshold. In some implementations, block 510A2 includes sub-block 510A2A. At sub-block 510A2A, the system makes the determination of block 510A2 using a gaze parameter for the selected parameter set (i.e., selected in a most recent iteration of block 506 of method 500). For example, the system can adapt the gaze persistence measure, based on a gaze persistence parameter of the selected parameter set, and compare the adapted gaze persistence measure to a static gaze persistence measure threshold in making the determination. For instance, the gaze persistence measure can be boosted or reduced, based on the gaze persistence parameter of the selected parameter set (e.g., a restrictive gaze persistence parameter can reduce, while a permissive gaze persistence parameter can boost (or not modify)). As another example, the system can instead compare the gaze persistence measure to a gaze persistence measure threshold for the selected parameter set (e.g., either a restrictive gaze persistence measure threshold or a permissive gaze persistence measure threshold).

In FIG. 5B, block 508B1 is an example of aspect(s) of block 508, and block 510B1 is an example of aspect(s) of block 510.

At block 508B1, the system determines, for each detected face and based on frames of vision data and optionally frames of audio data, active speech measure(s).

At block 510B1, the system determines, for each active speech measure, whether it indicates active speech from the corresponding detected face. In some implementations, block 510B1 includes sub-block 510B1A in which: the system determines whether an active speech measure, for a face, indicates active speech based on comparing the active speech measures to an active speech threshold for the selected parameter set (i.e., selected in a most recent iteration of block 506 of method 500) or, alternatively, the system adapts (e.g., boosts or reduces) the active speech measure based on an active speech parameter for the selected parameter set (e.g., a permissive active speech parameter can boost (or not modify), while a restrictive active speech parameter can reduce), and compares the adapted active speech measure to a default active speech threshold.

Figure 6:
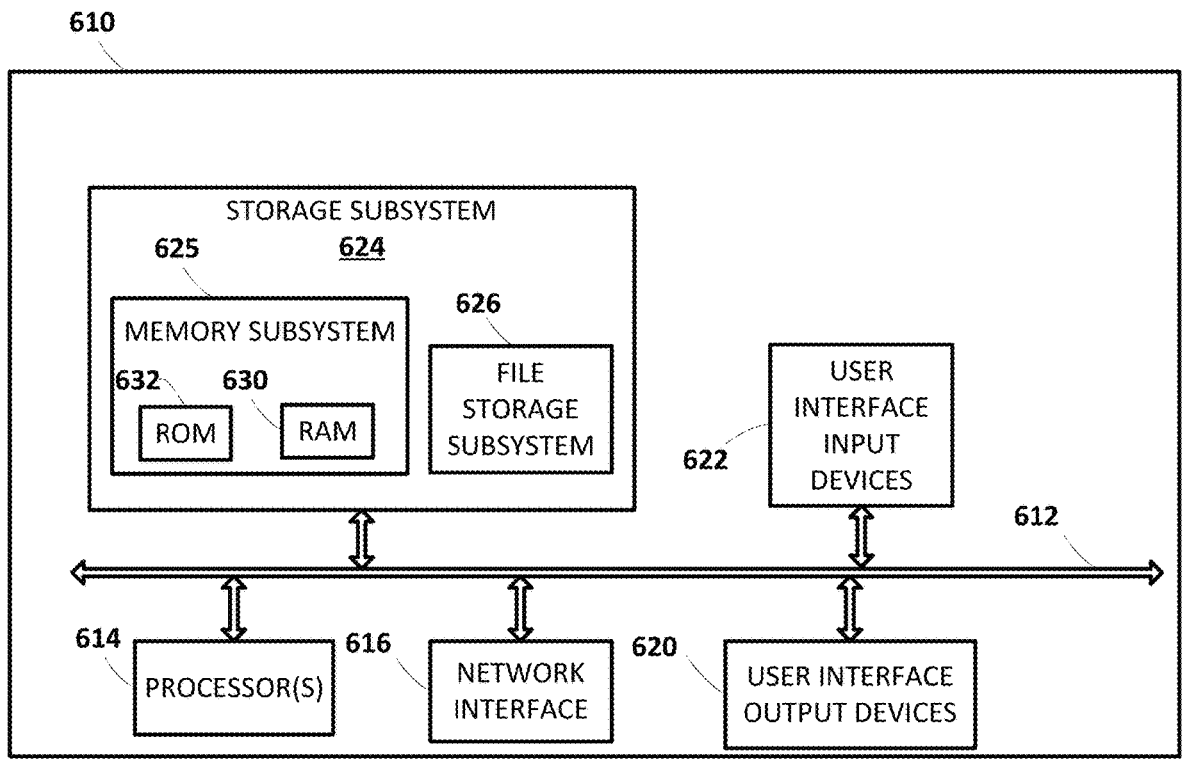
FIG. 6 illustrates an example architecture of a computing device.

FIG. 6 is a block diagram of an example computing device 610 that may optionally be utilized to perform one or more aspects of techniques described herein. In some implementations, one or more of a client device, cloud-based automated assistant component(s), and/or other component(s) may comprise one or more components of the example computing device 610.

Computing device 610 typically includes at least one processor 614 which communicates with a number of peripheral devices via bus subsystem 612. These peripheral devices may include a storage subsystem 624, including, for example, a memory subsystem 625 and a file storage subsystem 626, user interface output devices 620, user interface input devices 622, and a network interface subsystem 616. The input and output devices allow user interaction with computing device 610. Network interface subsystem 616 provides an interface to outside networks and is coupled to corresponding interface devices in other computing devices.

User interface input devices 622 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computing device 610 or onto a communication network.

User interface output devices 620 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computing device 610 to the user or to another machine or computing device.

Storage subsystem 624 stores programming and data constructs that provide the functionality of some or all of the modules described herein. For example, the storage subsystem 624 may include the logic to perform selected aspects of the method of FIGS. 5, 5A, and/or 5B, as well as to implement various components depicted in FIGS. 1, 2, and 3.

These software modules are generally executed by processor 614 alone or in combination with other processors. Memory 625 used in the storage subsystem 624 can include a number of memories including a main random access memory (RAM) 630 for storage of instructions and data during program execution and a read only memory (ROM) 632 in which fixed instructions are stored. A file storage subsystem 626 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 626 in the storage subsystem 624, or in other machines accessible by the processor(s) 614.

Bus subsystem 612 provides a mechanism for letting the various components and subsystems of computing device 610 communicate with each other as intended. Although bus subsystem 612 is shown schematically as a single bus, alternative implementations of the bus subsystem may use multiple busses.

Computing device 610 can be of varying types including a workstation, server, computing cluster, blade server, server farm, or any other data processing system or computing device. Due to the ever-changing nature of computers and networks, the description of computing device 610 depicted in FIG. 6 is intended only as a specific example for purposes of illustrating some implementations. Many other configurations of computing device 610 are possible having more or fewer components than the computing device depicted in FIG. 6.

In situations in which the systems described herein collect or otherwise monitor personal information about users, or may make use of personal and/or monitored information), the users may be provided with an opportunity to control whether programs or features collect user information (e.g., information about a user's social network, social actions or activities, profession, a user's preferences, or a user's current geographic location), or to control whether and/or how to receive content from the content server that may be more relevant to the user. Also, certain data may be treated in one or more ways before it is stored or used, so that personal identifiable information is removed. For example, a user's identity may be treated so that no personal identifiable information can be determined for the user, or a user's geographic location may be generalized where geographic location information is obtained (such as to a city, ZIP code, or state level), so that a particular geographic location of a user cannot be determined. Thus, the user may have control over how information is collected about the user and/or used. For example, users can opt out of assistant devices using vision component 107 and/or using vision data from vision component 107 in enabling hot word free interaction with an automated assistant.

In some implementations a method implemented by one or more processors is provided and includes performing iterations of determining whether a user is engaging in hot word free interaction with an automated assistant of the client device. Performing each of the iterations includes: generating one or more respective measures for the user and using the one or more respective measures, along with a permissive parameter set, in determining whether the user is engaging in hot word free interaction with the automated assistant. Generating the one or more respective measures can be based on processing one or more respective image frames generated by a camera of the client device and/or processing one or more respective audio data frames generated by one or more microphones of the client device. When it is determined that the user is engaging in hot word free interaction with the automated assistant, processing performed by the automated assistant is automatically adapted. The method further includes determining, during performing the iterations, that the user is engaged in conversation with at least one additional user. The method further includes, in response to determining that the user is engaged in conversation, using a restrictive parameter set, in lieu of the permissive parameter set, in performing further of the iterations of determining whether the user is engaging in hot word free interaction with the automated assistant. Using the restrictive parameter set in performing the further of the iterations can include using one or more respective measures for the further of the iterations, along with the restrictive parameter set, in determining whether the user is engaging in hot word free interaction with the automated assistant. Using the restrictive parameter set, relative to using the permissive parameter set, constrains the set of conditions that will result in determining that the user is engaging in hot word free interaction with the automated assistant.

These and other implementations of the technology disclosed herein can optionally include one more of the following features.

In some implementations, determining that the user is engaged in conversation includes: determining, based on processing at least one image frame generated by the camera, that an additional user is co-present with the user; and determining that the user is engaged in conversation as a function of determining that the additional user is co-present with the user. In some versions of those implementations, determining that the user is engaged in conversation further includes: determining that at least a threshold amount or duration of iterations have been performed without determining that the user is engaging in hot word free interaction with the automated assistant; and determining that the user is engaged in conversation further as a function of determining that at least the threshold amount or duration of iterations have been performed. In some of those versions, the method further includes initiating performing the iterations in response to detecting human presence via one or more sensors of the client device. The sensor(s) can include, for example, the camera and/or an additional vision sensor that is lower fidelity than the camera. In some additional or alternative versions of those implementations, determining that the user is engaged in the conversation further includes: determining that at least some of the respective measures satisfy at least one or more respective lower bound thresholds, while other of the respective measures fail to satisfy one or more respective upper bound thresholds defined by the permissive parameter set; and determining that the user is engaged in conversation further as a function of determining that at least some of the respective measures satisfy the one or more respective lower bound thresholds while other of the respective measures fail to satisfy the one or more respective upper bound thresholds. In some of those additional or alternative versions, determining that the user is engaged in the conversation further includes: detecting, based on processing one or more of the respective audio data frames, one or more occurrences of voice activity; and determining that the user is engaged in conversation further as a function of detecting the one or more occurrences of voice activity.

In some implementations, determining that the user is engaged in the conversation includes: determining that at least some of the respective measures satisfy one or more respective lower bound thresholds, while failing to satisfy one or more respective upper bound thresholds defined by the permissive parameter set; and determining that the user is engaged in conversation as a function of determining that at least some of the respective measures satisfy the one or more respective lower bound thresholds while failing to satisfy the one or more respective upper bound thresholds.

In some implementations, determining that the user is engaged in the conversation includes: determining that at least some of the respective measures satisfy at least one or more respective lower bound thresholds, while other of the respective measures fail to satisfy one or more respective upper bound thresholds defined by the permissive parameter set; and determining that the user is engaged in conversation further as a function of determining that at least some of the respective measures satisfy the one or more respective lower bound thresholds while other of the respective measures fail to satisfy the one or more respective upper bound thresholds.

In some implementations, the method further includes, in response to determining that the user is engaged in conversation, visually rendering, at a display of the client device, a visual cue that persists during at least part of the further of the iterations.

In some implementations, the method further includes: determining, during performing the further of the iterations, that the user is no longer engaged in conversation; and, in response to determining that the user is no longer engaged in conversation, again using the permissive parameter set, in lieu of the restrictive parameter set, in performing yet further of the iterations of determining whether the user is engaging in hot word free interaction with the automated assistant.

In some implementations, the permissive parameter set includes a first permissive threshold and the restrictive parameter set includes a first restrictive threshold that is more restrictive than the first permissive threshold. In some of those implementations, using the permissive parameter set along with the one or more respective measures in determining whether the user is engaging in hot word free interaction with the automated assistant includes: comparing a respective measure, of the one or more respective measures, to the first permissive threshold in determining whether the user is engaging in the hot word free interaction with the automated assistant.

In some implementations, the permissive parameter set includes a first permissive measure adjustment and the restrictive parameter set includes a first restrictive measure adjustment that is more restrictive than the first permissive measure adjustment. In some of those implementations, using the permissive parameter set along with the one or more respective measures in determining whether the user is engaging in hot word free interaction with the automated assistant includes: adjusting a respective measure, of the one or more respective measures, according to the first permissive measure adjustment, to generate an adjusted measure; and using the adjusted measure in determining whether the user is engaging in the hot word free interaction with the automated assistant.

In some implementations, generating the one or more respective measures for the user includes generating one or more gaze measures based on processing the one or more respective image frames and independent of processing the one or more respective audio frames. In some versions of those implementations, the one or more gaze measures include a gaze direction for eyes, of the user, captured in the one or more respective image frames. In some of those versions, using the one or more respective measures, along with the restrictive parameter set, in determining whether the user is engaging in hot word free interaction with the automated assistant includes: determining, based on the gaze direction and using at least one permissive parameter of the permissive parameter set, whether the gaze direction is directed towards the device; and using the determination of whether the gaze direction is directed towards the device in determining whether the user is engaging in hot word free interaction with the automated assistant. In those some versions, the permissive parameter defines a less constrained gaze area than does a counterpart restrictive parameter of the restrictive parameter set, and the restrictive parameter set lacks the permissive parameter. In some additional or alternative versions of those implementations, the one or more gaze measures include a gaze persistence measure for a gaze of the user. In some of those additional or alternative versions, using the one or more respective measures, along with the restrictive parameter set, in determining whether the user is engaging in hot word free interaction with the automated assistant includes: determining, based on the gaze persistence measure and using at least one permissive parameter of the permissive parameter set, whether the gaze is persistently directed towards the device; and using the determination of whether the gaze is persistently directed towards the device in determining whether the user is engaging in hot word free interaction with the automated assistant. In those some alternative or additional versions, the permissive parameter defines a lesser extent of persistence than does a counterpart restrictive parameter of the restrictive parameter set, and the restrictive parameter set lacks the permissive parameter.

In some implementations, generating the one or more respective measures for the user includes generating, based on processing the one or more respective image frames, an active speech measure that indicates whether the user is actively speaking. In some versions of those implementations, generating the active speech measure is further based on processing, along with the one or more respective image frames, one or more of the respective audio data frames that temporally correspond to the one or more respective audio data frames. In some additional or alternative versions of those implementations, using the one or more respective measures, along with the restrictive parameter set, in determining whether the user is engaging in hot word free interaction with the automated assistant includes: comparing the active speech measure to a permissive threshold, of the permissive parameter set, in determining whether the user is engaging in the hot word free interaction with the automated assistant. In those some additional or alternative versions, the permissive threshold defines a lesser degree of confidence in active speaking than does a counterpart restrictive threshold of the restrictive parameter set, and the restrictive parameter set lacks the permissive threshold.

In some implementations, determining that the user is engaged in conversation includes: receiving, at the client device, a transmission that indicates that a phone call is occurring via an additional client device that is linked with the client device; and determining that the user is engaged in conversation in response to receiving the indication.

In some implementations, determining that the user is engaged in conversation includes: detecting, based on processing one or more of the respective audio data frames, an occurrence of a phone ringing or vibrating; and determining that the user is engaged in conversation in response to detecting the occurrence of the phone ringing or vibrating.

What is claimed is:

1. A client device, comprising:
   a camera;
   one or more microphones;
   memory storing instructions; and
   one or more processors operable to execute the instructions to:
   determine whether a user, that is in an environment with the client device, is engaged in conversation with at least one additional user;
   select, in dependence on whether the user is engaged in conversation with at least one additional user, a permissive parameter set or a restrictive parameter set;
   perform iterations of determining whether the user is engaging in hot word free interaction with an automated assistant of the client device, wherein in performing each of the iterations one or more of the processors are to:
   generate one or more respective measures for the user based on processing:
   one or more respective image frames generated by the camera, and/or
   one or more respective audio data frames generated by one or more of the microphones; and
   use the one or more respective measures, along with the selected one of the permissive parameter set or the restrictive parameter set, in determining whether the user is engaging in hot word free interaction with the automated assistant,
   wherein, when it is determined that the user is engaging in hot word free interaction with the automated assistant, one or more of the processors are further to cause processing performed by the automated assistant to be automatically adapted, and
   wherein using the restrictive parameter set, relative to using the permissive parameter set, constrains the set of conditions that will result in determining that the user is engaging in hot word free interaction with the automated assistant.

2. The client device of claim 1, wherein in determining that the user is engaged in conversation one or more of the processors are to:
   determine, based on processing at least one image frame generated by the camera, that an additional user is co-present with the user; and
   determine that the user is engaged in conversation as a function of determining that the additional user is co-present with the user.

3. The client device of claim 1, wherein one or more of the processors are further operable to execute the instructions to:
   in response to determining that the user is engaged in conversation:
   visually render, at a display of the client device, a visual cue that persists during at least part of the iterations.

4. The client device of claim 1, wherein the permissive parameter set includes a first permissive threshold and wherein the restrictive parameter set includes a first restrictive threshold that is more restrictive than the first permissive threshold, and wherein in using the permissive parameter set along with the one or more respective measures in determining whether the user is engaging in hot word free interaction with the automated assistant one or more of the processors are to:
   compare a respective measure, of the one or more respective measures, to the first permissive threshold in determining whether the user is engaging in the hot word free interaction with the automated assistant.

5. The client device of claim 1, wherein the permissive parameter set includes a first permissive measure adjustment and wherein the restrictive parameter set includes a first restrictive measure adjustment that is more restrictive than the first permissive measure adjustment, and wherein in using the permissive parameter set along with the one or more respective measures in determining whether the user is engaging in hot word free interaction with the automated assistant one or more of the processors are to:
   adjust a respective measure, of the one or more respective measures, according to the first permissive measure adjustment, to generate an adjusted measure; and
   use the adjusted measure in determining whether the user is engaging in the hot word free interaction with the automated assistant.

6. The client device of claim 1,
   wherein in generating the one or more respective measures for the user one or more of the processors are to generate one or more gaze measures based on processing the one or more respective image frames and independent of processing the one or more respective audio frames.

7. The client device of claim 6, wherein the one or more gaze measures comprise a gaze direction for eyes, of the user, captured in the one or more respective image frames, and wherein in using the one or more respective measures, along with the restrictive parameter set, in determining whether the user is engaging in hot word free interaction with the automated assistant one or more of the processors are to:

determine, based on the gaze direction and using at least one permissive parameter of the permissive parameter set, whether the gaze direction is directed towards the device; and use the determination of whether the gaze direction is directed towards the device in determining whether the user is engaging in hot word free interaction with the automated assistant, wherein the permissive parameter defines a less constrained gaze area than does a counterpart restrictive parameter of the restrictive parameter set, the restrictive parameter set lacking the permissive parameter.

8. The client device of claim 6, wherein the one or more gaze measures comprise a gaze persistence measure for a gaze of the user, and wherein in using the one or more respective measures, along with the restrictive parameter set, in determining whether the user is engaging in hot word free interaction with the automated assistant one or more of the processors are to:

determine, based on the gaze persistence measure and using at least one permissive parameter of the permissive parameter set, whether the gaze is persistently directed towards the device; and use the determination of whether the gaze is persistently directed towards the device in determining whether the user is engaging in hot word free interaction with the automated assistant, wherein the permissive parameter defines a lesser extent of persistence than does a counterpart restrictive parameter of the restrictive parameter set, the restrictive parameter set lacking the permissive parameter.

9. The client device of claim 1, wherein in generating the one or more respective measures for the user one or more of the processors are to generate, based on processing the one or more respective image frames, an active speech measure that indicates whether the user is actively speaking.

10. The client device of claim 9, wherein in generating the active speech measure one or more of the processors are further to process, along with the one or more respective image frames, one or more of the respective audio data frames that temporally correspond to the one or more respective image frames.

11. The client device of claim 1, wherein in determining that the user is engaged in conversation one or more of the processors are to:

receive a transmission that indicates that a phone call is occurring via an additional client device that is linked with the client device; and determine that the user is engaged in conversation in response to receiving the transmission that indicates the phone call is occurring.

12. The client device of claim 1, wherein in determining that the user is engaged in conversation one or more of the processors are to:

detect an occurrence of a phone ringing or vibrating; and determine that the user is engaged in conversation in response to detecting the occurrence of the phone ringing or vibrating.

13. A method implemented by one or more processors, the method comprising:

determining whether a user, that is in an environment with a client device, is engaged in conversation with at least one additional user;

selecting, in dependence on whether the user is engaged in conversation with at least one additional user, a permissive parameter set or a restrictive parameter set;

performing iterations of determining whether the user is engaging in hot word free interaction with an automated assistant of the client device, wherein performing each of the iterations comprises:

generating one or more respective measures for the user based on processing:

one or more respective image frames generated by a camera of the client device, and/or one or more respective audio data frames generated by one or more microphones of the client device; and using the one or more respective measures, along with the selected one of the permissive parameter set or the restrictive parameter set, in determining whether the user is engaging in hot word free interaction with the automated assistant, wherein, when it is determined that the user is engaging in hot word free interaction with the automated assistant, processing performed by the automated assistant is automatically adapted, and wherein using the restrictive parameter set, relative to using the permissive parameter set, constrains the set of conditions that will result in determining that the user is engaging in hot word free interaction with the automated assistant, and wherein using the restrictive parameter set mitigates false positive occurrences of automatically adapting processing performed by the automated assistant.

14. The method of claim 13, wherein determining that the user is engaged in conversation comprises:

determining, based on processing at least one image frame generated by the camera, that an additional user is co-present with the user; and determining that the user is engaged in conversation as a function of determining that the additional user is co-present with the user.

15. The method of claim 14, further comprising:

in response to determining that the user is engaged in conversation:

visually rendering, at a display of the client device, a visual cue that persists during at least part of the iterations.

16. The method of claim 13, wherein the permissive parameter set includes a first permissive threshold and wherein the restrictive parameter set includes a first restrictive threshold that is more restrictive than the first permissive threshold, and wherein using the permissive parameter set along with the one or more respective measures in determining whether the user is engaging in hot word free interaction with the automated assistant comprises:

comparing a respective measure, of the one or more respective measures, to the first permissive threshold in determining whether the user is engaging in the hot word free interaction with the automated assistant.

17. The method of claim 13, wherein the permissive parameter set includes a first permissive measure adjustment and wherein the restrictive parameter set includes a first restrictive measure adjustment that is more restrictive than the first permissive measure adjustment, and wherein using the permissive parameter set along with the one or more respective measures in determining whether the user is engaging in hot word free interaction with the automated assistant comprises:
  adjusting a respective measure, of the one or more respective measures, according to the first permissive measure adjustment, to generate an adjusted measure; and
  using the adjusted measure in determining whether the user is engaging in the hot word free interaction with the automated assistant.

18. The method of claim 13, wherein determining that the user is engaged in conversation comprises:
  receiving a transmission that indicates that a phone call is occurring via an additional client device that is linked with the client device; and
  determining that the user is engaged in conversation in response to receiving the transmission that indicates the phone call is occurring.

19. The method of claim 13, wherein determining that the user is engaged in conversation comprises:
  detecting an occurrence of a phone ringing or vibrating; and
  determining that the user is engaged in conversation in response to detecting the occurrence of the phone ringing or vibrating.

20. The method of claim 13, wherein generating the one or more respective measures for the user comprises generating one or more gaze measures based on processing the one or more respective image frames and independent of processing the one or more respective audio frames.

* * * * *